United States Patent
Olivieri et al.

(10) Patent No.: US 11,580,954 B2
(45) Date of Patent: Feb. 14, 2023

(54) SYSTEMS AND METHODS OF HANDLING SPEECH AUDIO STREAM INTERRUPTIONS

(71) Applicant: QUALCOMM Incorporated, San Diego, CA (US)

(72) Inventors: Ferdinando Olivieri, San Diego, CA (US); Reid Westburg, Del Mar, CA (US); Shankar Thagadur Shivappa, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 123 days.

(21) Appl. No.: 17/166,250

(22) Filed: Feb. 3, 2021

(65) Prior Publication Data

US 2022/0246133 A1    Aug. 4, 2022

(51) Int. Cl.
*G10L 13/08* (2013.01)
*G10L 13/027* (2013.01)
*H04N 7/14* (2006.01)
*H04N 7/15* (2006.01)

(52) U.S. Cl.
CPC ............ *G10L 13/08* (2013.01); *G10L 13/027* (2013.01); *H04N 7/147* (2013.01); *H04N 7/157* (2013.01)

(58) Field of Classification Search
None
See application file for complete search history.

(56) References Cited

U.S. PATENT DOCUMENTS

| | | | |
|---|---|---|---|
| 9,843,673 B1 | 12/2017 | Chug et al. | |
| 10,971,161 B1* | 4/2021 | Vilke | H04L 65/611 |
| 2016/0198040 A1 | 7/2016 | Karimi-Cherkandi et al. | |
| 2017/0237784 A1* | 8/2017 | Maistri | H04L 69/14 |
| | | | 348/14.02 |
| 2017/0332044 A1* | 11/2017 | Marlow | G06V 20/46 |
| 2018/0218727 A1* | 8/2018 | Cutler | H04L 65/762 |
| 2018/0358003 A1* | 12/2018 | Calle | G10L 15/183 |
| 2020/0035215 A1* | 1/2020 | Yang | G10L 25/63 |
| 2020/0090648 A1 | 3/2020 | Wambugu et al. | |
| 2020/0302954 A1* | 9/2020 | Totzke | H04N 7/152 |
| 2022/0217425 A1* | 7/2022 | Thagadur Shivappa | |
| | | | H04L 65/1069 |

FOREIGN PATENT DOCUMENTS

CN    107393544 A    11/2017

OTHER PUBLICATIONS

International Search Report and Written Opinion—PCT/US2021/072831—ISA/EPO—dated Mar. 25, 2022.

\* cited by examiner

*Primary Examiner* — Stella L. Woo
(74) *Attorney, Agent, or Firm* — Qualcomm Incorporated

(57) ABSTRACT

A device for communication includes one or more processors configured to receive, during an online meeting, a speech audio stream representing speech of a first user. The one or more processors are also configured to receive a text stream representing the speech of the first user. The one or more processors are further configured to selectively generate an output based on the text stream in response to an interruption in the speech audio stream.

30 Claims, 14 Drawing Sheets

SYSTEMS AND METHODS OF HANDLING SPEECH AUDIO STREAM INTERRUPTIONS

I. FIELD

The present disclosure is generally related to systems and methods of handling speech audio stream interruptions.

II. DESCRIPTION OF RELATED ART

Advances in technology have resulted in smaller and more powerful computing devices. For example, there currently exist a variety of portable personal computing devices, including wireless telephones such as mobile and smart phones, tablets and laptop computers that are small, lightweight, and easily carried by users. These devices can communicate voice and data packets over wireless networks. Further, many such devices incorporate additional functionality such as a digital still camera, a digital video camera, a digital recorder, and an audio file player. Also, such devices can process executable instructions, including software applications, such as a web browser application, that can be used to access the Internet. As such, these devices can include significant computing capabilities.

Such computing devices often incorporate functionality to receive an audio signal from one or more microphones. For example, the audio signal may represent user speech captured by the microphones, external sounds captured by the microphones, or a combination thereof. Such devices may include communication devices used for online meetings or calls. Network issues during an online meeting between a first user and a second user can cause frame loss such that some audio and video frames sent by a first device of the first user are not received by a second device of the second user.

Frame loss due to network problems can lead to non-recoverable information loss during the online meeting. For example, the second user has to guess what was missed or ask the first user to repeat what was missed, which adversely impacts user experience.

III. SUMMARY

According to one implementation of the present disclosure, a device for communication includes one or more processors configured to receive, during an online meeting, a speech audio stream representing speech of a first user. The one or more processors are also configured to receive a text stream representing the speech of the first user. The one or more processors are further configured to selectively generate an output based on the text stream in response to an interruption in the speech audio stream.

According to another implementation of the present disclosure, a method of communication includes receiving, at a device during an online meeting, a speech audio stream representing speech of a first user. The method also includes receiving, at the device, a text stream representing the speech of the first user. The method further includes selectively generating, at the device, an output based on the text stream in response to an interruption in the speech audio stream.

According to another implementation of the present disclosure, a non-transitory computer-readable medium includes instructions that, when executed by one or more processors, cause the one or more processors to receive, during an online meeting, a speech audio stream representing speech of a first user. The instructions, when executed by the one or more processors, also cause the one or more processors to receive a text stream representing the speech of the first user. The instructions, when executed by the one or more processors, further cause the one or more processors to selectively generate an output based on the text stream in response to an interruption in the speech audio stream.

According to another implementation of the present disclosure, an apparatus includes means for receiving a speech audio stream during an online meeting, the speech audio stream representing speech of a first user. The apparatus also includes means for receiving a text stream representing the speech of the first user. The apparatus further includes means for selectively generating an output based on the text stream in response to an interruption in the speech audio stream.

Other aspects, advantages, and features of the present disclosure will become apparent after review of the entire application, including the following sections: Brief Description of the Drawings, Detailed Description, and the Claims.

IV. BRIEF DESCRIPTION OF THE DRAWINGS

V. DETAILED DESCRIPTION

Figure 1:
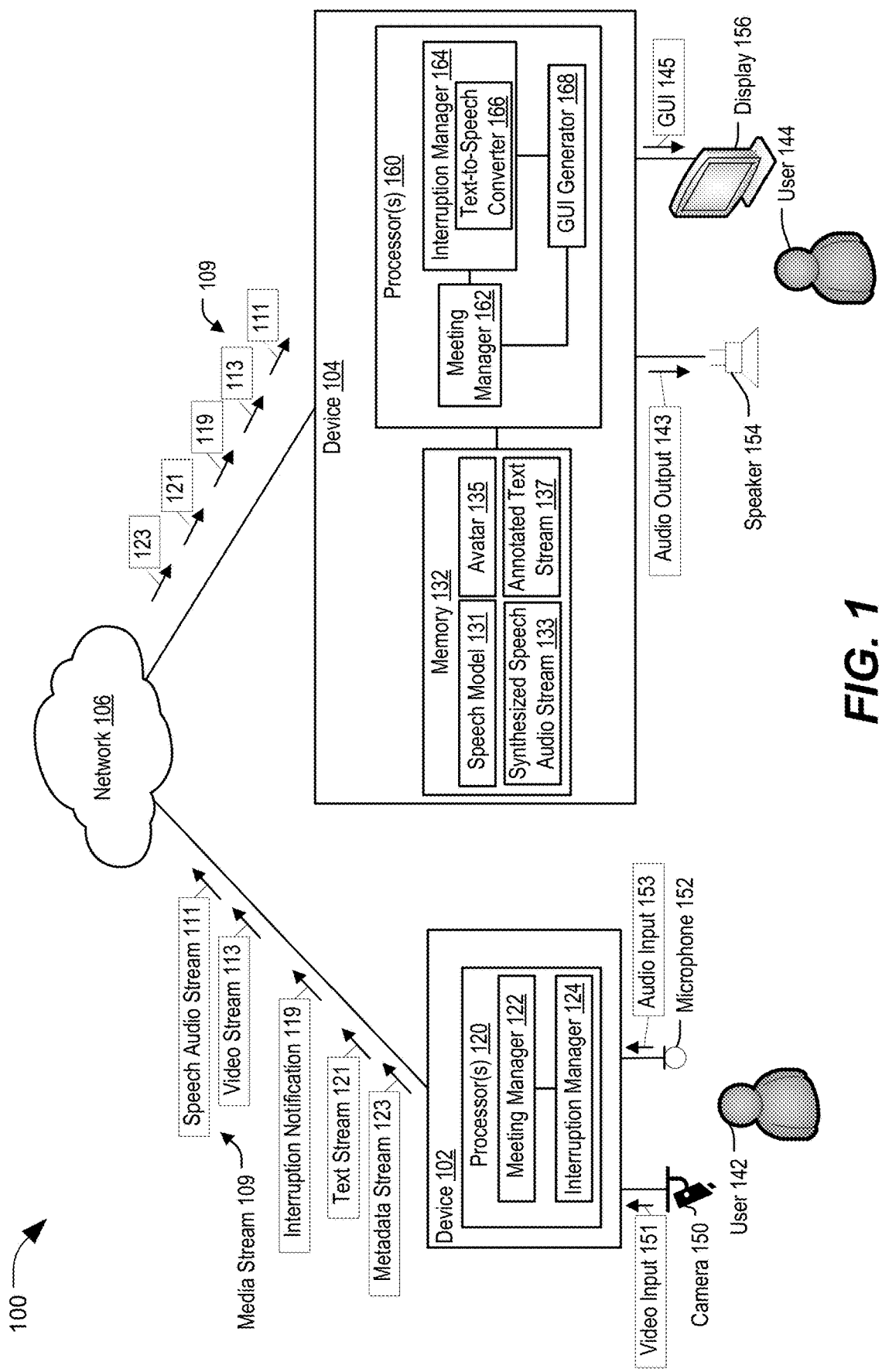
FIG. 1 is a block diagram of a particular illustrative aspect of a system operable to handle speech audio stream interruptions, in accordance with some examples of the present disclosure.

Missing a portion of an online meeting or a call can adversely impact user experience. For example, during an online meeting between a first user and a second user, if some audio frames sent by a first device of the first user are not received by a second device of the second user, the second user can miss a portion of speech of the first user. The second user has to guess what was said by the first user or ask the first user to repeat what was missed. This can cause miscommunication, disrupt the flow of conversation, and waste time.

Systems and methods of handling speech audio stream interruptions are disclosed. For example, each device includes a meeting manager that is configured to establish an online meeting or a call between the device and one or more other devices. An interruption manager (at a device or at a server) is configured to handle speech audio stream interruptions.

During an online meeting between a first device of a first user and a second device of a second user, a meeting manager of the first device sends a media stream to the second device. The media stream includes a speech audio stream, a video stream, or both. The speech audio stream corresponds to speech of the first user during the meeting.

A stream manager (at the first device or at a server) generates a text stream by performing speech-to-text conversion on the speech audio stream and forwards the text stream to the second device. A stream manager (e.g., a meeting manager at the first device or at the server), in a first operating mode (e.g., a send caption data mode), forwards the text stream concurrently with the media stream throughout the online meeting. In an alternative example, a stream manager (e.g., an interruption manager at the first device or at the server), in a second operating mode (e.g., a send interruption data mode), forwards the text stream to the second device in response to detecting network issues (e.g., low bandwidth, packet loss, etc.) with sending the media stream to the second device.

In some examples, network issues cause interruption in receipt of the media stream at the second device without interruption in receipt of the text stream. In some examples, the second device, in a first operating mode (e.g., display caption data mode), provides the text stream to a display independently of detecting network issues. In other examples, the second device, in a second operating mode (e.g., display interruption data mode), displays the text stream in response to detecting an interruption in the media stream.

In a particular example, the stream manager (e.g., a meeting manager or an interruption manager) forwards a metadata stream in addition to the text data. The metadata indicates emotion, intonations, other attributes of the speech of the first user. In a particular example, the second device displays the metadata stream in addition to the text stream. For example, the text stream is annotated based on the metadata stream.

In a particular example, the second device performs text-to-speech conversion on the text stream to generate a synthesized speech audio stream, and outputs the synthesized speech audio stream (e.g., to replace the interrupted speech audio stream). In a particular example, the text-to-speech conversion is based at least in part on the metadata stream.

In a particular example, the second device displays an avatar (e.g., to replace the interrupted video stream) during the output of the synthesized speech audio stream. In a particular example, the text-to-speech conversion is based on a generic speech model. For example, a first generic speech model can be used for one user, and a second generic speech model can be used for another user for listeners to be able to distinguish between speech corresponding to different users. In another particular example, the text-to-speech conversion is based on a user speech model generated based on speech of the first user. In a particular example, the user speech model is generated in advance of the online meeting. In a particular example, the user speech model is generated (or updated) during the online meeting. In a particular example, the user speech model is initialized from a generic speech model and updated based on speech of the first user.

In a particular example, the avatar indicates that the speech model is being trained. For example, the avatar is initialized as red to indicate that a generic speech model is being used (or that the user speech model is not ready), and the avatar transitions from red to green over time to indicate that the speech model is being trained. A green avatar indicates that the user speech model is trained (or that the user speech model is ready).

The online meeting could be between more than two users. In a situation where the first device is experiencing network problems but a third device of a third user in the online meeting is not experiencing network problems, the second device can output the synthesized speech audio stream for the first user concurrently with outputting a second media stream received from the third device that corresponds to speech, video, or both, of the third user.

Particular aspects of the present disclosure are described below with reference to the drawings. In the description, common features are designated by common reference numbers. As used herein, various terminology is used for the purpose of describing particular implementations only and is not intended to be limiting of implementations. For example, the singular forms "a," "an," and "the" are intended to include the plural forms as well, unless the context clearly indicates otherwise. Further, some features described herein are singular in some implementations and plural in other implementations. To illustrate, FIG. 1 depicts a device 104 including one or more processors ("processor(s)" 160 of FIG. 1), which indicates that in some implementations the device 104 includes a single processor 160 and in other implementations the device 104 includes multiple processors 160.

As used herein, the terms "comprise," "comprises," and "comprising" may be used interchangeably with "include," "includes," or "including." Additionally, the term "wherein" may be used interchangeably with "where." As used herein, "exemplary" indicates an example, an implementation, and/or an aspect, and should not be construed as limiting or as indicating a preference or a preferred implementation. As used herein, an ordinal term (e.g., "first," "second," "third," etc.) used to modify an element, such as a structure, a component, an operation, etc., does not by itself indicate any priority or order of the element with respect to another element, but rather merely distinguishes the element from another element having a same name (but for use of the ordinal term). As used herein, the term "set" refers to one or more of a particular element, and the term "plurality" refers to multiple (e.g., two or more) of a particular element.

As used herein, "coupled" may include "communicatively coupled," "electrically coupled," or "physically coupled," and may also (or alternatively) include any combinations thereof. Two devices (or components) may be coupled (e.g., communicatively coupled, electrically coupled, or physically coupled) directly or indirectly via one or more other devices, components, wires, buses, networks (e.g., a wired network, a wireless network, or a combination thereof), etc. Two devices (or components) that are electrically coupled may be included in the same device or in different devices and may be connected via electronics, one or more connectors, or inductive coupling, as illustrative, non-limiting examples. In some implementations, two devices (or components) that are communicatively coupled, such as in electrical communication, may send and receive signals (e.g., digital signals or analog signals) directly or indirectly, via one or more wires, buses, networks, etc. As used herein, "directly coupled" may include two devices that are coupled (e.g., communicatively coupled, electrically coupled, or physically coupled) without intervening components.

In the present disclosure, terms such as "determining," "calculating," "estimating," "shifting," "adjusting," etc. may be used to describe how one or more operations are performed. It should be noted that such terms are not to be construed as limiting and other techniques may be utilized to perform similar operations. Additionally, as referred to herein, "generating," "calculating," "estimating," "using," "selecting," "accessing," and "determining" may be used interchangeably. For example, "generating," "calculating," "estimating," or "determining" a parameter (or a signal) may refer to actively generating, estimating, calculating, or determining the parameter (or the signal) or may refer to using, selecting, or accessing the parameter (or signal) that is already generated, such as by another component or device.

Referring to FIG. 1, a particular illustrative aspect of a system configured to handle speech audio stream interruptions is disclosed and generally designated 100. The system 100 includes a device 102 coupled via a network 106 to a device 104. The network 106 includes a wired network, a wireless network, or both. The device 102 is coupled to a camera 150, a microphone 152, or both. The device 104 is coupled to a speaker 154, a display device 156, or both.

The device 104 includes one or more processors 160 coupled to a memory 132. The one or more processors 160 includes a meeting manager 162 coupled to an interruption manager 164. The meeting manager 162 and the interruption manager 164 are coupled to a graphical user interface (GUI) generator 168. The interruption manager 164 includes a text-to-speech converter 166. The device 102 includes one or more processors 120 that include a meeting manager 122 coupled to an interruption manager 124. The meeting manager 122 and the meeting manager 162 are configured to establish an on-line meeting (e.g., an audio call, a video call, a conference call, etc.). In a particular example, the meeting manager 122 and the meeting manager 162 correspond to clients of a communication application (e.g., an online meeting application). The interruption manager 124 and the interruption manager 164 are configured to handle speech audio interruptions.

In some implementations, the meeting manager 122 and the meeting manager 162 are blind (e.g., unaware) of any speech audio interruption that is managed by the interruption manager 124 and the interruption manager 164. In some implementations, the meeting manager 122 and the meeting manager 162 correspond to a higher layer (e.g., application layer) of a network protocol stack (e.g., open systems interconnection (OSI) model) of the device 102 and the device 104, respectively. In some implementations, the interruption manager 124 and the interruption manager 164 correspond to a lower level (e.g., a transport layer) of the network protocol stack of the device 102 and the device 104, respectively.

In some implementations, the device 102, the device 104, or both, correspond to or are included in various types of devices. In an illustrative example, the one or more processors 120, the one or more processors 160, or a combination thereof, are integrated in a headset device, such as described further with reference to FIG. 11. In other examples, the one or more processors 120, the one or more processors 160, or a combination thereof, are integrated in at least one of a mobile phone or a tablet computer device, as described with reference to FIG. 10, a wearable electronic device, as described with reference to FIG. 12, a voice-controlled speaker system, as described with reference to FIG. 13, a camera device, as described with reference to FIG. 14, or a virtual reality headset, augmented reality headset, or mixed reality headset, as described with reference to FIG. 15. In another illustrative example, the one or more processors 120, the one or more processors 160, or a combination thereof, are integrated into a vehicle, such as described further with reference to FIG. 16 and FIG. 17.

During operation, the meeting manager 122 and the meeting manager 162 establish an online meeting (e.g., an audio call, a video call, a conference call, or a combination thereof) between the device 102 and the device 104. For example, the online meeting is between a user 142 of the device 102 and a user 144 of the device 104. The microphone 152 captures speech of the user 142 while the user 142 is talking and provides audio input 153 representing the speech to the device 102. In a particular aspect, the camera 150 (e.g., a still camera, a video camera, or both) captures one or more images (e.g., still images or a video) of the user 142 and provides video input 151 representing the one or more images to the device 102. In a particular aspect, the camera 150 provides the video input 151 to the device 102 concurrently with the microphone 152 providing the audio input 153 to the device 102.

The meeting manager 122 generates a media stream 109 of media frames based on the audio input 153, the video input 151, or both. For example, the media stream 109 includes a speech audio stream 111, a video stream 113, or both. In a particular aspect, the meeting manager 122 sends the media stream 109 via the network 106 to the device 104 in real-time. For example, the meeting manager 122 generates media frames of the media stream 109 as the video input 151, the audio input 153, or both, are being received and sends (e.g., initiates transmission of) the media stream 109 of media frames as the media frames are generated.

In a particular implementation, the meeting manager 122, during a first operating mode (e.g., a send caption data mode) of the device 102, generates a text stream 121, a metadata stream 123, or both based on the audio input 153. For example, the meeting manager 122 performs speech-to-text conversion on the audio input 153 to generate the text stream 121. The text stream 121 indicates text corresponding to the speech detected in the audio input 153. In a particular aspect, the meeting manager 122 performs speech intonation analysis on the audio input 153 to generate the metadata stream 123. For example, the metadata stream 123 indicates intonations (e.g., emotion, pitch, tone, or a combination thereof) of the speech detected in the audio input 153. In the first operating mode (e.g., the send caption data mode) of the device 102, the meeting manager 122 sends the text stream 121, the metadata stream 123, or both, (e.g., as closed captioning data) with the media stream 109 to the device 104 (e.g., independently of network issues or speech audio interruptions). Alternatively, the meeting manager 122, during a second operating mode (e.g., a send interruption data mode) of the device 102, refrains from generating the text stream 121 and the metadata stream 123 in response to determining that no speech audio interruption is detected.

The device 104 receives the media stream 109 of media frames via the network 106 from the device 102. In a particular implementation, the device 104 receives sets (e.g., bursts) of media frames of the media stream 109. In an alternative implementation, the device 104 receives one media frame at a time of the media stream 109. The meeting manager 162 plays out the media frames of the media stream 109. For example, the meeting manager 162 generates an audio output 143 based on the speech audio stream 111 and plays out (e.g., as streaming audio content) the audio output 143 via the speaker 154. In a particular aspect, the GUI generator 168 generates a GUI 145 based on the media stream 109, as further described with reference to FIG. 3A. For example, the GUI generator 168 generates (or updates) the GUI 145 to display video content of the video stream 113 and provides the GUI 145 (e.g., streams the video content) to the display device 156. The user 144 can view the images of the user 142 on the display device 156 while listening to the audio speech of the user 142 via the speaker 154.

In a particular implementation, the meeting manager 162 stores the media frames of the media stream 109 in a buffer prior to playout. For example, the meeting manager 162 adds a delay between receiving a media frame and playback of the media frame at a first playback time to increase a likelihood that a subsequent media frame is available at a corresponding playback time (e.g., a second playback time) in the buffer. In a particular aspect, the meeting manager 162 plays out the media stream 109 in real-time. For example, the meeting manager 162 retrieves media frames of the media stream 109 from the buffer to playout the audio output 143, the video content of the GUI 145, or both, while subsequent media frames of the media stream 109 are being received (or are expected to be received) by the device 104.

The meeting manager 162, in a first operating mode (e.g., a display caption data mode) of the device 104, plays out the text stream 121 with the media stream 109 (e.g., independently of detecting an interruption in the speech audio stream 111). In a particular aspect, the meeting manager 162 receives the text stream 121, the metadata stream 123, or both, with the media stream 109, e.g., during the first operating mode (e.g., the send caption data mode) of the device 102. In an alternative aspect, the meeting manager 162 does not receive the text stream 121, the metadata stream 123, or both, e.g., during the second operating mode (e.g., the send interruption data mode) of the device 102, and generates the text stream 121, the metadata stream 123, or both, based on the speech audio stream 111, the video stream 113, or both. For example, the meeting manager 162 performs speech-to-text conversion the speech audio stream 111 to generate the text stream 121 and performs intonation analysis on the speech audio stream 111 to generate the metadata stream 123.

During the first operating mode (e.g., the display caption data mode) of the device 104, the meeting manager 162 provides the text stream 121 as output to the display device 156. For example, the meeting manager 162 displays text content (e.g., as closed captions) of the text stream 121 using the GUI 145 concurrently with displaying the video content of the video stream 113, providing the audio output 143 to the speaker 154, or both. To illustrate, the meeting manager 162 provides the text stream 121 to the GUI generator 168 concurrently with providing the video stream 113 to the GUI generator 168. The GUI generator 168 updates the GUI 145 to display the text stream 121, the video stream 113, or both. The GUI generator 168 provides the updates of the GUI 145 to the display device 156 concurrently with the meeting manager 162 providing the speech audio stream 111 as the audio output 143 to the speaker 154.

In a particular example, the meeting manager 162 generates an annotated text stream 137 based on the text stream 121 and the metadata stream 123. In a particular aspect, the meeting manager 162 generates the annotated text stream 137 by adding annotations to the text stream 121 based on the metadata stream 123. The meeting manager 162 provides the annotated text stream 137 as output to the display device 156. For example, the meeting manager 162 plays out the annotated text stream 137 with the media stream 109. To illustrate, the meeting manager 162 displays annotated text content (e.g., as closed captions with intonation indications) of the annotated text stream 137 using the GUI 145 concurrently with displaying the video content of the video stream 113, providing the audio output 143 to the speaker 154, or both.

In a particular implementation, the meeting manager 162 refrains from playing out the text stream 121 (e.g., the annotated text stream 137) in a second operating mode (e.g., display interruption data mode or closed caption disable mode) of the device 104. For example, the meeting manager 162 does not receive the text stream 121 (e.g., during the second operating mode of the device 102) and does not generate the text stream 121 in the second operating mode (e.g., display interruption data mode or closed caption disable mode). As another example, the meeting manager 162 receives the text stream 121 and, in response to detecting the second operating mode (e.g., display interruption data mode or closed caption disable mode) of the device 104, refrains from playing out the text stream 121 (e.g., the annotated text stream 137). In a particular aspect, the interruption manager 164, in the second operating mode (e.g., display interruption data mode) of the device 104, refrains from playing out the text stream 121 (e.g., the annotated text stream 137) in response to determining that no interruption has been detected in the media stream 109 (e.g., portions of the media stream 109 corresponding to the text stream 121 have been received).

In a particular aspect, the interruption manager 164 initializes a speech model 131, such as an artificial neural network, based on a generic speech model prior to, or near the beginning of, the online meeting. In a particular aspect, the interruption manager 164 selects the generic speech model from a plurality of generic speech models based on determining that the generic speech model matches (e.g., is associated with) demographic data of the user 142, such as the user's age, location, gender, or a combination thereof. In a particular aspect, the interruption manager 164 predicts the demographic data prior to the online meeting (e.g., a scheduled meeting) based on contact information (e.g., name, location, phone number, address, or a combination thereof) of the user 142. In a particular aspect, the interruption manager 164 estimates the demographic data based on the speech audio stream 111, the video stream 113, or both, during a beginning portion of the online meeting. For example, the interruption manager 164 analyses the speech audio stream 111, the video stream 113, or both, to estimate an age, a regional accent, a gender, or a combination thereof, of the user 142. In a particular aspect, the interruption manager 164 retrieves the speech model 131 (e.g., previously generated) associated with (e.g., matching a user identifier of) the user 142.

In a particular aspect, the interruption manager 164 trains (e.g., generates or updates) the speech model 131 based on speech detected in the speech audio stream 111 (e.g., prior to an interruption in the speech audio stream 111) during the online meeting. To illustrate, the text-to-speech converter 166 is configured to use the speech model 131 to perform text-to-speech conversion. In a particular aspect, the interruption manager 164 receives (e.g., during the first operating mode of the device 102) or generates (e.g., during the second operating mode of the device 102) the text stream 121, the metadata stream 123, or both, corresponding to the speech audio stream 111. The text-to-speech converter 166 uses the speech model 131 to generate a synthesized speech audio stream 133 by performing text-to-speech conversion on the text stream 121, the metadata stream 123, or both. The interruption manager 164 uses training techniques to update the speech model 131 based on a comparison of the speech audio stream 111 and the synthesized speech audio stream 133. In an illustrative example in which the speech model 131 includes an artificial neural network, the interruption manager 164 uses backpropagation to update weights and biases of the speech model 131. According to some aspects, the speech model 131 is updated so that subsequent text-to-speech conversion using the speech model 131 is more likely to generate synthesized speech that is a closer match of speech characteristics of the user 142.

In a particular aspect, the interruption manager 164 generates an avatar 135 (e.g., a visual representation) of the user 142. In a particular aspect, the avatar 135 includes or corresponds to a training indicator that indicates a level of training of the speech model 131, as further described with reference to FIGS. 3A-3C. For example, the interruption manager 164, in response to determining that a first training criterion is not satisfied, initializes the avatar 135 to a first visual representation indicating that the speech model 131 is not trained. During the online meeting, the interruption manager 164, in response to determining that the first training criterion is satisfied and a second training criterion is not satisfied, updates the avatar 135 from the first visual representation to a second visual representation to indicate that training of the speech model 131 is in progress. The interruption manager 164, in response to determining that the second training criterion is satisfied, updates the avatar 135 to a third visual representation (to indicate that training of the speech model 131 is complete.

A training criterion can be based on a count of audio samples used for training the speech model 131, a playback duration of audio samples used for training the speech model 131, a coverage of the audio samples used for training speech model 131, a success metric of the speech model 131, or a combination thereof. In a particular aspect, the coverage of the audio samples used for training speech model 131 corresponds to distinct sounds (e.g., vowels, consonants, etc.) represented by the audio samples. In a particular aspect, a success metric is based on a comparison of (e.g., a match between) audio samples used for training the speech model 131 and synthetic speech generated based on the speech model 131.

According to some implementations, a first color, a first shading, a first size, a first animation, or a combination thereof, of the avatar 135 indicates that the speech model 131 is not trained. A second color, a second shading, a second size, a second animation, or a combination thereof, of the avatar 135 indicates that the speech model 131 is partially trained. A third color, a third shading, a third size, a third animation, or a combination thereof, of the avatar 135 indicates that training of the speech model 131 is complete. In a particular aspect, the GUI generator 168 generates (or updates) the GUI 145 to indicate the visual representation of the avatar 135.

In a particular aspect, the interruption manager 124 detects network issues (e.g., reduced bandwidth) in a communication link to the device 104. The interruption manager 124, in response to detecting the network issues, sends an interruption notification 119 to the device 104 indicating an interruption in the speech audio stream 111, refrains from sending (e.g., halts transmission of) subsequent media frames of the media stream 109 to the device 104 until detecting that the network issues are resolved, or both. For example, the interruption manager 124, in response to detecting the network issues, refrains from sending (e.g., halts transmission of) the speech audio stream 111, the video stream 113, or both, to the device 104 until ending of the interruption.

The interruption manager 124 sends the text stream 121, the metadata stream 123, or both, corresponding to the subsequent media frames. For example, the interruption manager 124, in the first operating mode of the device 102 (e.g., the send caption data mode), continues to send the text stream 121, the metadata stream 123, or both corresponding to the subsequent media frames. To illustrate, in the first operating mode (e.g., the send caption data mode), the meeting manager 122 generates the media stream 109, the text stream 121, the metadata stream 123, or a combination. The interruption manager 124, in response to detecting network issues in the first operating mode (e.g., the send caption data mode), halts transmission of subsequent media frames of the media stream 109 and continues transmission of the text stream 121, the metadata stream 123, or both, corresponding to the subsequent media frames t the device 104. Alternatively, the interruption manager 124, in response to detecting the network issues in a second operating mode (e.g., the send interruption data mode) of the device 102, generates the text stream 121, the metadata stream 123, or both, based on the audio input 153 corresponding to the subsequent media frames. To illustrate, in the second operating mode (e.g., the send interruption data mode), the meeting manager 122 generates the media stream 109 and does not generate the text stream 121, the metadata stream 123, or both. The interruption manager 124, in response to detecting the network issues in the second operating mode (e.g., the send interruption data mode) of the device 102, halts transmission of subsequent media frames of the media stream 109 and initiates sending of the text stream 121, the metadata stream 123, or both corresponding to the subsequent media frames to the device 104. In a particular aspect, in the second operating mode (e.g., the send interruption data mode) of the device 102, sending the text stream 121, the metadata stream 123, or both, to the device 104 corresponds to sending the interruption notification 119 to the device 104.

In a particular aspect, the interruption manager 164 detects an interruption in the speech audio stream 111 in response to receiving the interruption notification 119 from the device 102. In a particular aspect, when the device 102 is operating in the second operating mode (e.g., the send interruption data mode), the interruption manager 164 detects the interruption in the speech audio stream 111 in response to receiving the text stream 121, the metadata stream 123, or both.

In a particular aspect, the interruption manager 164 detects the interruption in the speech audio stream 111 in response to determining that no audio frames of the speech audio stream 111 are received within a threshold duration of a last received audio frame of the speech audio stream 111. For example, the last received audio frame of the speech audio stream 111 is received at a first receipt time at the device 104. The interruption manager 164 detects the interruption in response to determining that no audio frames of the speech audio stream 111 are received within a threshold duration of the first receipt time. In a particular aspect, the interruption manager 164 sends an interruption notification to the device 102. In a particular aspect, the interruption manager 124 detects network issues in response to receiving the interruption notification from the device 104. The interruption manager 124, in response to detecting the network issues, sends the text stream 121, the metadata stream 123, or both (e.g., instead of sending subsequent media frames of the media stream 109) to the device 104, as described above.

The interruption manager 164, in response to detecting the interruption, selectively generates an output based on the text stream 121. For example, the interruption manager 164, in response to the interruption, provides the text stream 121, the metadata stream 123, the annotated text stream 137, or a combination thereof, to the text-to-speech converter 166. The text-to-speech converter 166 generates a synthesized speech audio stream 133 by using the speech model 131 to perform a text-to-speech conversion based on the text stream 121, the metadata stream 123, the annotated text stream 137, or a combination thereof. For example, the synthesized speech audio stream 133 based on the text stream 121 and independent of the metadata stream 123 corresponds to speech indicated by the text stream 121 having neutral speech characteristics of the user 142 as represented by the speech model 131. As another example, the synthesized speech audio stream 133 based on the annotated text stream 137 (e.g., the text stream 121 and the metadata stream 123) corresponds to speech indicated by the text stream 121 having speech characteristics of the user 142 as represented by the speech model 131 with intonations indicated by the metadata stream 123. Using the speech model 131 that is at least partially trained on speech of the user 142 (e.g., the speech audio stream 111) to perform the text-to-speech conversion enables the synthesized speech audio stream 133 to more closely match speech characteristics of the user 142. The interruption manager 164, in response to the interruption, provides the synthesized speech audio stream 133 as the audio output 143 to the speaker 154, halts playback of the speech audio stream 111, halts playback of the video stream 113, or a combination thereof.

In a particular aspect, the interruption manager 164 selectively displays the avatar 135 concurrently with providing the synthesized speech audio stream 133 as the audio output 143 to the speaker 154. For example, interruption manager 164 refrains from displaying the avatar 135 while providing the speech audio stream 111 as the audio output 143 to the speaker 154. As another example, the interruption manager 164 displays the avatar 135 while providing the synthesized speech audio stream 133 as the audio output 143 to the speaker 154. To illustrate, the GUI generator 168 updates the GUI 145 to display the avatar 135 instead of the video stream 113 while the synthesized speech audio stream 133 is output as the audio output 143 for playout by the speaker 154. In a particular aspect, the interruption manager 164 displays a first representation of the avatar 135 concurrently with providing the speech audio stream 111 as the audio output 143 to the speaker 154 and displays a second representation of the avatar 135 concurrently with providing the synthesized speech audio stream 133 as the audio output 143 to the speaker 154. For example, the first representation indicates that the avatar 135 is being or has been trained (e.g., a training indicator of the speech model 131) and the second representation indicates that the avatar 135 is speaking (e.g., the speech model 131 is being used to generate synthesized speech), as further described with reference to FIG. 3C.

In a particular implementation, the interruption manager 164 selectively provides the text stream 121, the annotated text stream 137, or both, as output to the display device 156. For example, the interruption manager 164, in response to the interruption during a second operating mode (e.g., the display interruption data mode) of the device 104, provides the text stream 121, the annotated text stream 137, or both, to the GUI generator 168 to update the GUI 145 to display the text stream 121, the annotated text stream 137, or both. In an alternative implementation, the interruption manager 164, during a first operating mode (e.g., the display caption data mode) of the device 104, continues to provide the text stream 121, the annotated text stream 137, or both, as output to the display device 156 (e.g., independently of the interruption). In a particular aspect, the interruption manager 164 provides the text stream 121, the annotated text stream 137, both, to the display device 156 concurrently with providing the synthesized speech audio stream 133 as the audio output 143 to the speaker 154.

In a particular implementation, the interruption manager 164, based on an interruption configuration setting and in response to the interruption, outputs one or more of the synthesized speech audio stream 133, the text stream 121, or the annotated text stream 137. For example, the interruption manager 164, in response to the interruption and determining that the interruption configuration setting has a first value (e.g., 0 or "audio and text"), provides the text stream 121, the annotated text stream 137, or both, to the display device 156 concurrently with providing the synthesized speech audio stream 133 as the audio output 143 to the speaker 154. The interruption manager 164, in response to the interruption and determining that the interruption configuration setting has a second value (e.g., 1 or "text-only"), provides the text stream 121, the annotated text stream 137, or both, to the display device 156 and refrains from providing the audio output 143 to the speaker 154. The interruption manager 164, in response to the interruption and determining that the interruption configuration setting has a third value (e.g., 2 or "audio-only"), refrains from providing the text stream 121, the annotated text stream 137, or both, to the display device 156 and provides the synthesized speech audio stream 133 as the audio output 143 to the speaker 154. In a particular aspect, the interruption configuration setting is based on default data, user input, or both.

In a particular aspect, the interruption manager 124 detects that the interruption has ended and sends an interruption ended notification to the device 104. For example, the interruption manager 124 detects that the interruption has ended in response to determining that an available communication bandwidth of a communication link with the device 104 is greater than a threshold. In a particular aspect, the interruption manager 164 detects that the interruption has ended in response to receiving the interruption ended notification from the device 102.

In another a particular aspect, the interruption manager 164 detects that the interruption has ended and sends an interruption ended notification to the device 102. For example, the interruption manager 164 detects that the interruption has ended in response to determining that an available communication bandwidth of a communication link with the device 102 is greater than a threshold. In a particular aspect, the interruption manager 124 detects that the interruption has ended in response to receiving the interruption ended notification from the device 104.

The meeting manager 122, in response to detecting that the interruption has ended, resumes sending of the speech audio stream 111, the video stream 113, or both, to the device 104. In a particular aspect, sending of the speech audio stream 111, the video stream 113, or both, corresponds to sending of an interruption ended notification. The interruption manager 124, in response to detecting that the interruption has ended during the second operating mode (e.g., the send interruption data mode) of the device 102, refrains from sending the text stream 121, the metadata stream 123, or both, to the device 104.

The meeting manager 162, in response to detecting that the interruption has ended, refrains from generating the synthesized speech audio stream 133 based on the text stream 121, refrains from providing (e.g., halts) the synthesized speech audio stream 133 as the audio output 143 to the speaker 154, and resumes playback of (e.g., providing the) speech audio stream 111 as the audio output 143 to the speaker 154. The meeting manager 162, in response to detecting the interruption has ended, resumes providing the video stream 113 to the display device 156. For example, the meeting manager 162 provides the video stream 113 to the GUI generator 168 to update the GUI 145 to display the video stream 113.

In a particular aspect, the interruption manager 164, in response to detecting that the interruption has ended, sends a first request to the GUI generator 168 to update the GUI 145 to indicate that the speech model 131 is not being used to output synthetic speech audio (e.g., the avatar 135 is not speaking). The GUI generator 168, in response to receiving the first request, updates the GUI 145 to display a first representation of the avatar 135 indicating that the speech model 131 is being or has been trained and that the speech model 131 is not being used to output synthetic speech audio (e.g., the avatar 135 is not speaking). In an alternative aspect, the interruption manager 164, in response to detecting that the interruption has ended, sends a second request to the GUI generator 168 to halt display of the avatar 135. For example, the GUI generator 168, in response to receiving the second request, updates the GUI 145 to refrain from displaying the avatar 135.

In a particular aspect, the interruption manager 164, in response to detecting that the interruption has ended during the second operating mode (e.g., display interruption data more or the no captioned data mode), refrains from providing the text stream 121, the annotated text stream 137, or both, to the display device 156. For example, the GUI generator 168 updates the GUI 145 to refrain from displaying the text stream 121, the annotated text stream 137, or both.

The system 100 thus reduces (e.g., eliminates) information loss during an interruption of the speech audio stream 111 during an online meeting. For example, the user 144 continues to receive audio (e.g., the synthesized speech audio stream 133), text (e.g., the text stream 121, the annotated text stream 137, or both), or a combination thereof, corresponding to speech of the user 142 in cases where text can be received by the device 104 although network issues prevent the speech audio stream 111 from being received by the device 104.

Although the camera 150 and the microphone 152 are illustrated as being coupled to the device 102, in other implementations the camera 150, the microphone 152, or both may be integrated in the device 102. Although the speaker 154 and the display device 156 are illustrated as being coupled to the device 104, in other implementations the speaker 154, the display device 156, or both, may be integrated in the device 104. Although one microphone and one speaker are illustrated, in other implementations one or more additional microphones configured to capture user speech, one or more additional speakers configured to output speech audio, or a combination thereof, may be included.

It should be understood that the device 102 is described as a sending device and the device 104 is described as a receiving device for ease of illustration. During a call, roles of the device 102 and the device 104 can switch when the user 144 starts speaking. For example, the device 104 can be a sending device and the device 102 can be a receiving device. To illustrate, the device 104 can include a microphone and camera to capture audio and video of the user 144, and the device 102 can include or be coupled to a speaker and display to playout audio and video to the user 142. In a particular aspect, e.g., when both the user 142 and the user 144 are speaking at the same time or at overlapping times, each of the device 102 and the device 104 can be a sending device and a receiving device.

In a particular aspect, the meeting manager 122 is also configured to perform one or more operations described with reference to the meeting manager 162, and vice versa. In a particular aspect, the interruption manager 124 is also configured to perform one or more operations described with reference to the interruption manager 164, and vice versa. Although the GUI generator 168 is described as distinct from the meeting manager 162 and the interruption manager 164, in other implementations, the GUI generator 168 is integrated into the meeting manager 162, the interruption manager 164, or both. To illustrate, in some examples the meeting manager 162, the interruption manager 164, or both, are configured to perform some operations described with reference to the GUI generator 168.

Figure 2:
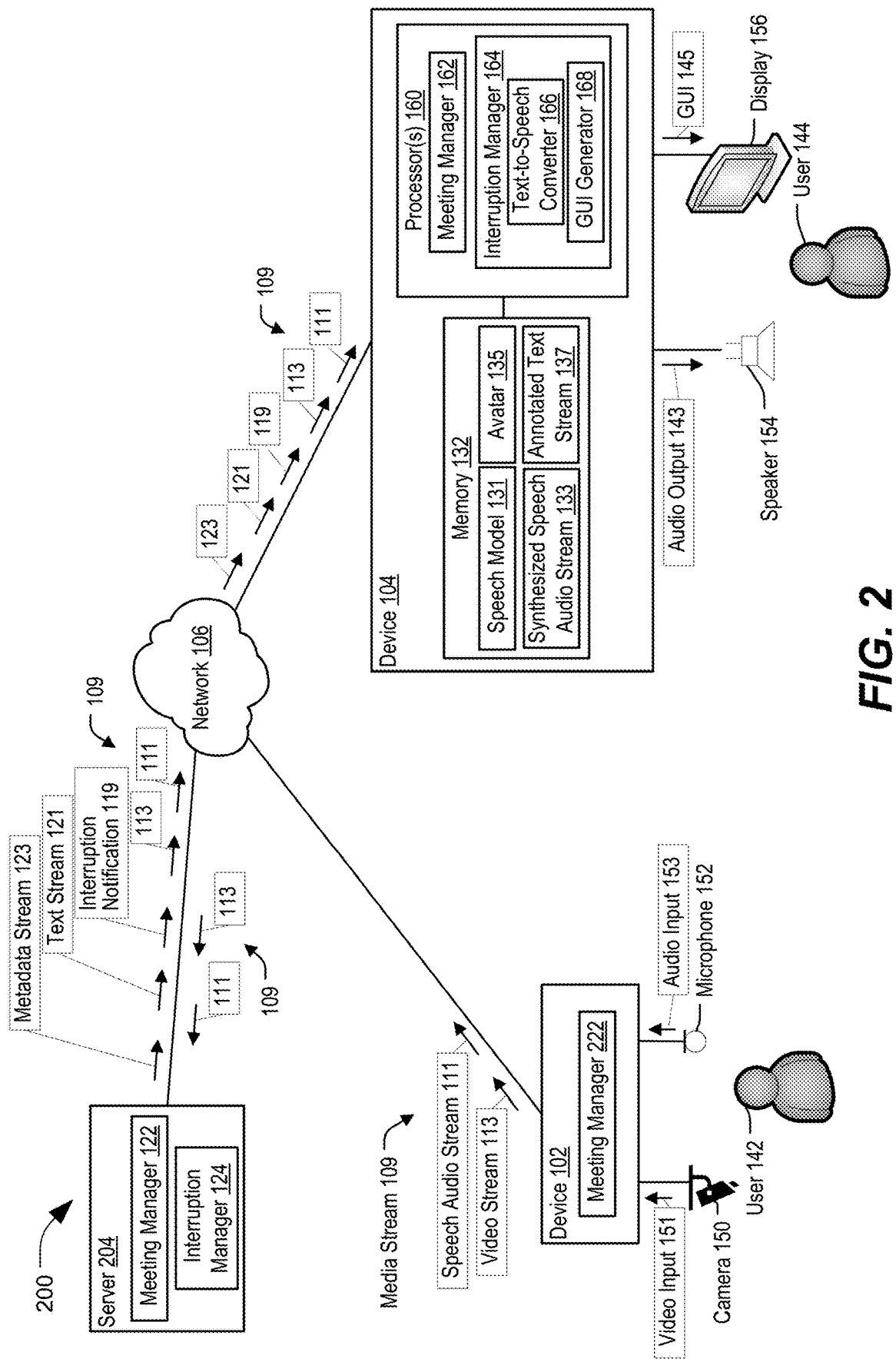
FIG. 2 is a diagram of an illustrative aspect of a system operable to handle speech audio stream interruptions, in accordance with some examples of the present disclosure.

Referring to FIG. 2, a system operable to handle speech audio stream interruptions is shown and generally designated 200. In a particular aspect, the system 100 of FIG. 1 includes one or more components of the system 200.

The system 200 includes a server 204 coupled via the network 106 to the device 102 and to the device 104. The server 204 includes the meeting manager 122 and the interruption manager 124. The server 204 is configured to forward online meeting data from the device 102 to the device 104, and vice versa. For example, the meeting manager 122 is configured to establish the online meeting between the device 102 and the device 104.

The device 102 includes a meeting manager 222. During the online meeting, the meeting manager 222 sends the media stream 109 (e.g., the speech audio stream 111, the video stream 113, or both) to the server 204. The meeting manager 122 of the server 204 receives the media stream 109 (e.g., the speech audio stream 111, the video stream 113, or both) from the device 102. In a particular implementation, the device 102 sends the text stream 121, the metadata stream 123, or both, concurrently with sending the media stream 109 to the server 204.

In a particular aspect, subsequent operations are performed as described with reference to FIG. 1 with the server 204 taking the place of the device 102. For example, the meeting manager 122 (operating at the server 204 instead of at the device 102 as in FIG. 1) sends the media stream 109, the text stream 121, the metadata stream 123, or a combination thereof, to the device 104, in a similar manner as described with reference to FIG. 1. For example, the meeting manager 122, during a first operating mode (e.g., a send captioned data mode) of the server 204, sends the text stream 121, the metadata stream 123, or both. In a particular implementation, the meeting manager 122 forwards the text stream 121, the metadata stream 123, or both, received from the device 102 to the device 104. In some implementations, the meeting manager 122 generates the metadata stream 123 based on the text stream 121, the media stream 109, or a combination thereof. In these implementations, the meeting manager 122 forwards the text stream 121 received from the device 102 to the device 104, sends the metadata stream 123 generated at the server 204 to the device 104, or both. In some implementations, the meeting manager 122 generates the text stream 121, the metadata stream 123, or both, based on the media stream 109 and forwards the text stream 121, the metadata stream 123, or both to the device 104. Alternatively, the meeting manager 122, during a second operating mode (e.g., a send interruption data mode) of the server 204, refrains from sending the text stream 121, the metadata stream 123, or both, in response to determining that no interruption is detected. The device 104 receives the media stream 109, the text stream 121, the annotated text stream 137, or a combination thereof, via the network 106 from the server 204. The meeting manager 162 plays out the media frames of the media stream 109, the text stream 121, the annotated text stream 137, or a combination thereof, as described with reference to FIG. 1. The interruption manager 164 trains the speech model 131, displays the avatar 135, or both, as described with reference to FIG. 1.

In a particular aspect, the interruption manager 124, in response to detecting network issues, sends an interruption notification 119 to the device 104 indicating an interruption in the speech audio stream 111, refrains from sending (e.g., halts transmission of) subsequent media frames of the media stream 109 to the device 104 until detecting that the network issues are resolved (e.g., the interruption has ended), or both. The interruption manager 124 sends the text stream 121, the metadata stream 123, or both, corresponding to the subsequent media frames to the device 104, as described with reference to FIG. 1. For example, the interruption manager 124 forwards the text stream 121, the metadata stream 123, or both, received from the device 102 to the device 104. In some examples, the interruption manager 124 sends the metadata stream 123, the text stream 121, or both, generated at the server 204 to the device 104. In a particular aspect, the interruption manager 124, during a second operating mode (e.g., a send interruption data mode) of the server 204, selectively generates the metadata stream 123, the text stream 121, or both, in response to detecting the interruption in the speech audio stream 111.

In a particular aspect, the interruption manager 164 detects an interruption in the speech audio stream 111 in response to receiving the interruption notification 119 from the interruption manager 124 (e.g., at the server 204), receiving the text stream 121, the metadata stream 123, or both when the server 204 is operating in the second operating mode (e.g., the send interruption data mode), determining that no audio frames of the speech audio stream 111 are received within a threshold duration of a last received audio frame of the speech audio stream 111, or a combination thereof, in a similar manner as described with reference to FIG. 1. In a particular aspect, the interruption manager 164 sends an interruption notification to the server 204. In a particular aspect, the interruption manager 124 detects network issues in response to receiving the interruption notification from the device 104. The interruption manager 124 sends the text stream 121, the metadata stream 123, or both, corresponding to the subsequent media frames to the device 104, as described with reference to FIG. 1.

The interruption manager 164, in response to detecting the interruption, provides the text stream 121, the metadata stream 123, the annotated text stream 137, or a combination thereof, to the text-to-speech converter 166. The text-to-speech converter 166 generates the synthesized speech audio stream 133 by using the speech model 131 to perform a text-to-speech conversion based on the text stream 121, the metadata stream 123, the annotated text stream 137, or a combination thereof, as described with reference to FIG. 1. The interruption manager 164, in response to the interruption, provides the synthesized speech audio stream 133 as the audio output 143 to the speaker 154, halts playback of the speech audio stream 111, halts playback of the video stream 113, displays the avatar 135, displays a particular representation of the avatar 135, displays the text stream 121, displays the annotated text stream 137, or a combination thereof, as described with reference to FIG. 1.

The meeting manager 122, in response to detecting that the interruption has ended, resumes sending of the speech audio stream 111, the video stream 113, or both, to the device 104. In a particular aspect, the interruption manager 124, in response to detecting that the interruption has ended during the second operating mode (e.g., the send interruption data mode) of the server 204, refrains from sending (e.g., ceases transmission of) the text stream 121, the metadata stream 123, or both, to the device 104.

The meeting manager 162, in response to detecting that the interruption has ended, refrains from generating the synthesized speech audio stream 133 based on the text stream 121, refrains from providing (e.g., halts) the synthesized speech audio stream 133 as the audio output 143 to the speaker 154, resumes playback of speech audio stream 111 as the audio output 143 to the speaker 154, resumes providing the video stream 113 to the display device 156, halts or adjusts display of the avatar 135, refrains from providing the text stream 121 to the display device 156, refrains from providing the annotated text stream 137 to the display device 156, or a combination thereof.

The system 200 thus reduces (e.g., eliminates) information loss during an interruption of the speech audio stream 111 during an online meeting with a legacy device (e.g., the device 102 that does not include an interruption manager). For example, the user 144 continues to receive audio (e.g., synthesized speech audio stream 133), text (e.g., the text stream 121, the annotated text stream 137, or both), or a combination thereof, corresponding to speech of the user 142 in cases where text can be received by the device 104 although network issues prevent the speech audio stream 111 from being received by the device 104.

In a particular aspect, the server 204 may also be closer (e.g., fewer network hops) to the device 104 and sending the text stream 121, the metadata stream 123, or both, from the server 204 (e.g., instead of from the device 102) may conserve overall network resources. In a particular aspect, the server 204 may have access to network information that can be useful for successfully sending the text stream 121, the metadata stream 123, or both to the device 104. As an example, the server 204 initially transmits the media stream 109 via a first network link. The server 204 detect network issues and, based at least in part on determining that the first network link is unavailable or non-functional, transmits the text stream 121, the metadata stream 123, or both, using a second network link that appears to be available to accommodate text transmissions.

Figure 3A:
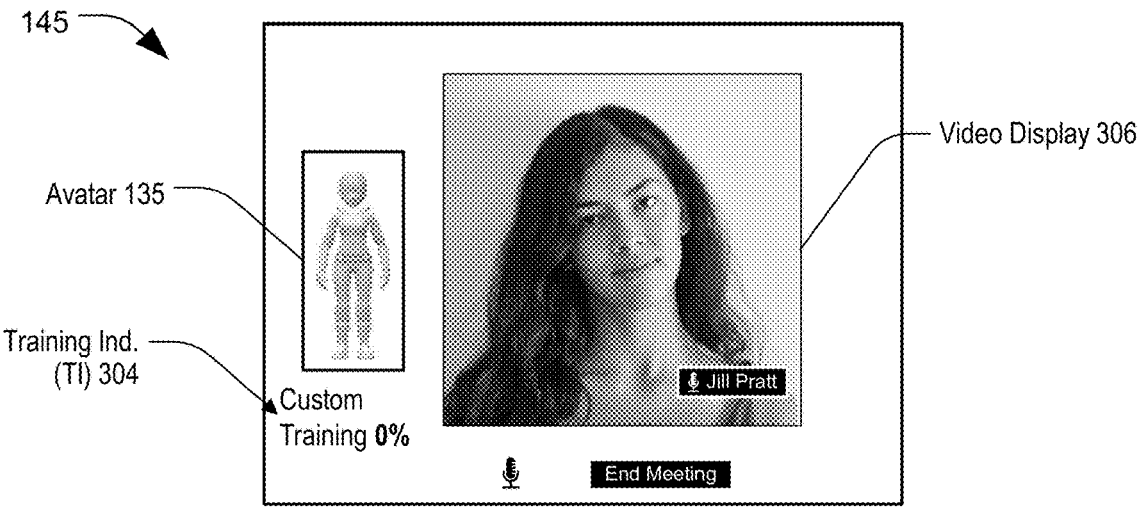
FIG. 3A is a diagram of an illustrative graphical user interface (GUI) generated by the system of FIG. 1 or the system of FIG. 2, in accordance with some examples of the present disclosure.

Referring to FIG. 3A, an example of the GUI 145 is shown. In a particular aspect, the GUI 145 is generated by the system 100 of FIG. 1, the system 200 of FIG. 2, or both.

The GUI 145 includes a video display 306, the avatar 135, and a training indicator (TI) 304. For example, the GUI generator 168 generates the GUI 145 during a beginning of an online meeting. The video stream 113 (e.g., images of the user 142 (e.g., Jill Pratt)) is displayed via the video display 306.

The training indicator 304 indicates a training level (e.g., 0% or untrained) of the speech model 131. For example, the training indicator 304 indicates that the speech model 131 has not been custom trained. In a particular aspect, a representation (e.g., a solid color) of the avatar 135 also indicates the training level. In a particular aspect, the representation of the avatar 135 indicates that synthesized speech is not being output. For example, the GUI 145 does not include a synthesized speech indicator, such as described further with reference to FIG. 3C.

In a particular implementation, if an interruption occurs prior to custom training of the speech model 131 and the text-to-speech converter 166 generates the synthesized speech audio stream 133 using the speech model 131 (e.g., a non-customized generic speech model), the synthesized speech audio stream 133 corresponds to audio speech having generic speech characteristics that may be different from speech characteristics of the user 142. In a particular aspect, the speech model 131 is initialized using a generic speech model associated with demographic data of the user 142. In this aspect, the synthesized speech audio stream 133 corresponds to generic speech characteristics that match the demographic data (e.g., age, gender, regional accent, etc.) of the user 142.

Figure 3B:
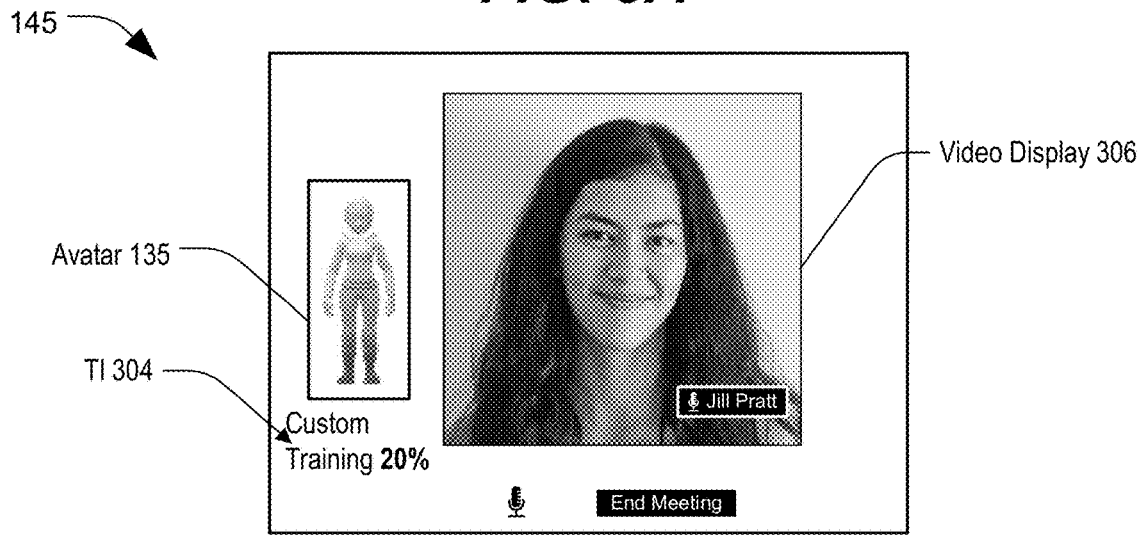
FIG. 3B is a diagram of an illustrative GUI generated by the system of FIG. 1 or the system of FIG. 2, in accordance with some examples of the present disclosure.

Referring to FIG. 3B, an example of the GUI 145 is shown. In a particular aspect, the GUI 145 is generated by the system 100 of FIG. 1, the system 200 of FIG. 2, or both.

In a particular example, the GUI generator 168 updates the GUI 145 during the online meeting. The training indicator 304 indicates a second training level (e.g., 20% or partially trained) of the speech model 131. For example, the training indicator 304 indicates that the speech model 131 is being custom trained or has been partially custom trained. In a particular aspect, a representation (e.g., partially colored) of the avatar 135 also indicates the second training level. In a particular aspect, the representation of the avatar 135 indicates that synthesized speech is not being output. For example, the GUI 145 does not include a synthesized speech indicator.

In a particular implementation, if an interruption occurs subsequent to partial custom training of the speech model 131 and the text-to-speech converter 166 generates the synthesized speech audio stream 133 using the speech model 131 (e.g., a partially customized speech model), the synthesized speech audio stream 133 corresponds to audio speech having speech characteristics that have some similarities with speech characteristics of the user 142.

Figure 3C:
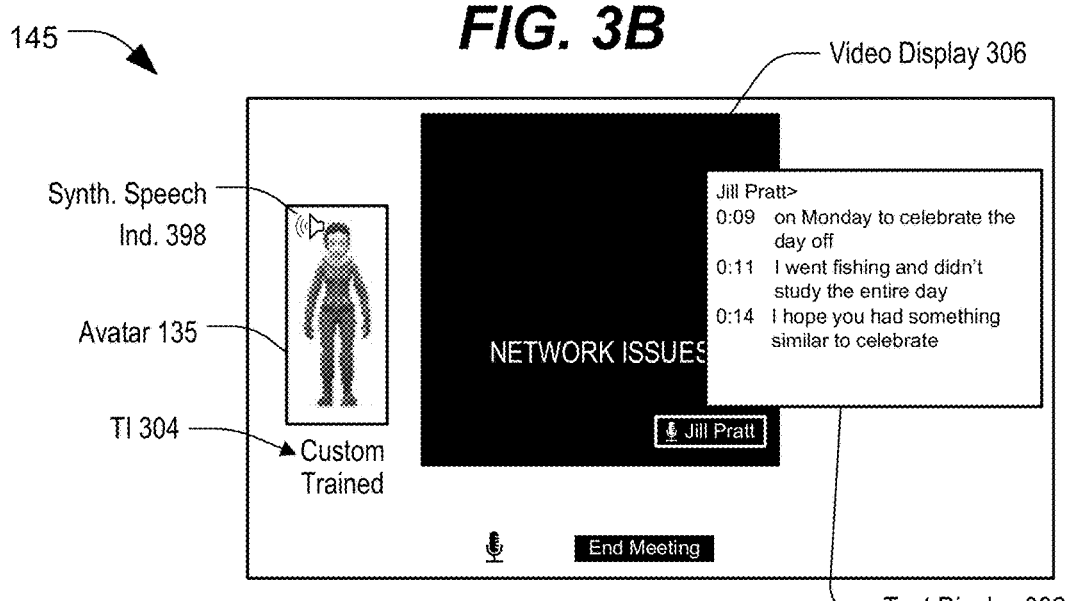
FIG. 3C is a diagram of an illustrative GUI generated by the system of FIG. 1 or the system of FIG. 2, in accordance with some examples of the present disclosure.

Referring to FIG. 3C, an example of the GUI 145 is shown. In a particular aspect, the GUI 145 is generated by the system 100 of FIG. 1, the system 200 of FIG. 2, or both.

In a particular example, the GUI generator 168 updates the GUI 145 in response to an interruption. The training indicator 304 indicates a third training level (e.g., 100% or training completed) of the speech model 131. For example, the training indicator 304 indicates that the speech model 131 is custom trained or custom training has been completed (e.g., reached a threshold level). In a particular aspect, a representation (e.g., fully colored) of the avatar 135 also indicates the third training level. In a particular aspect, the representation of the avatar 135 indicates that synthesized speech is being output. For example, the GUI 145 includes a synthesized speech indicator 398 displayed as part of, or in conjunction with, the avatar 135 to indicate that speech being played out is synthesized speech.

Since, in the example of FIG. 3C, the interruption occurs subsequent to custom training of the speech model 131 and the text-to-speech converter 166 generates the synthesized speech audio stream 133 using the speech model 131 (e.g., a customized speech model), the synthesized speech audio stream 133 corresponds to audio speech having speech characteristics that are similar to speech characteristics of the user 142.

The interruption manager 164, in response to the interruption, halts output of the video stream 113. For example, the video display 306 indicates that output of the video stream 113 has been halted due to an interruption (e.g., network issues). The GUI 145 includes a text display 396. For example, the interruption manager 164 outputs the text stream 121 via the text display 396 in response to the interruption.

In a particular aspect, the text stream 121 is displayed in real-time so that the user 144 can continue to participate in the conversation. For example, the user 144 can speak a reply to the user 142 after reading in the text display 396 what the user 142 said. In a particular aspect, if network issues prevent a speech audio stream corresponding to speech of the user 144 from being received by the device 102, the interruption manager 124 can display a text stream at the device 102 corresponding to the speech of the user 144. One or more participants of the online meeting can thus receive a text stream or a speech audio stream corresponding to speech of other participants.

Figure 4A:
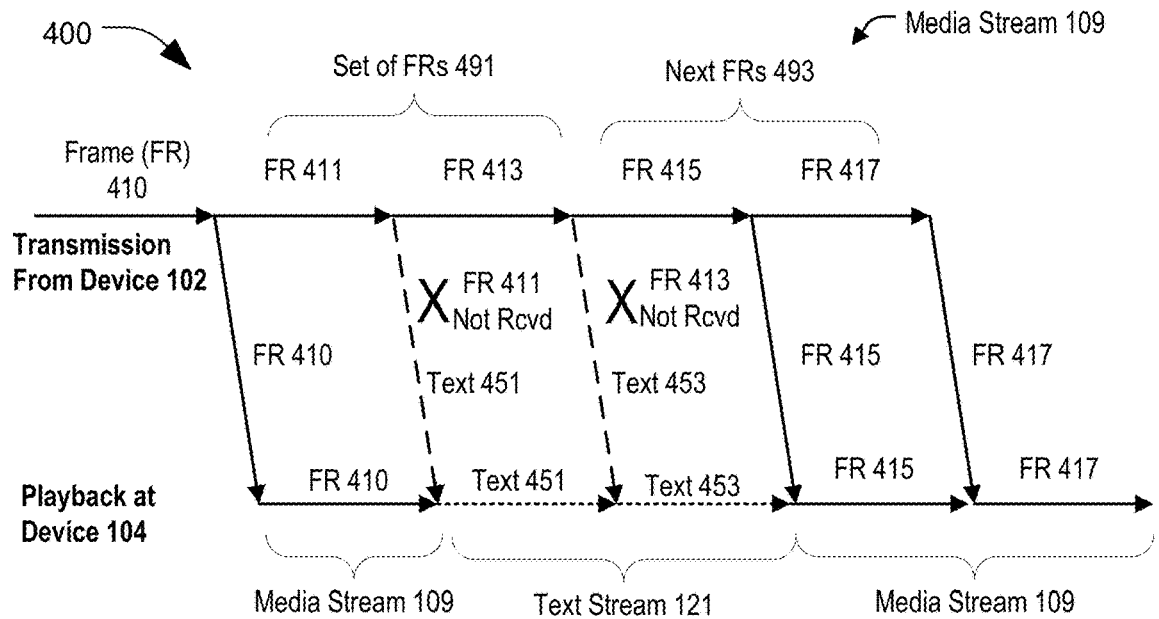
FIG. 4A is a diagram of an illustrative aspect of operations of the system of FIG. 1 or the system of FIG. 2, in accordance with some examples of the present disclosure.

Referring to FIG. 4A, a diagram of an illustrative aspect of operations of the system 100 of FIG. 1 or the system 200 of FIG. 2 is shown and generally designated 400. The timing and operations shown in FIG. 4A are for illustration and are not limiting. In other aspects, additional or fewer operations may be performed and the timing may be different.

The diagram 400 illustrates timing of transmission of media frames of the media stream 109 from the device 102. In a particular aspect, the media frames of the media stream 109 are transmitted from the device 102 to the device 104, as described with reference to FIG. 1. In an alternative aspect, the media frames of the media stream 109 are transmitted from the device 102 to the server 204 and from the server 204 to the device 102, as described with reference to FIG. 2.

The device 102 transmits a media frame (FR) 410 of the media stream 109 at a first transmit time. The device 104 receives the media frame 410 at a first receive time and provides the media frame 410 for playback a first playback time. In a particular example, the meeting manager 162 stores the media frame 410 in a buffer during a first buffering interval between the first receive time and the first playback time. In a particular aspect, the media frame 410 includes a first portion of the video stream 113 and a first portion of the speech audio stream 111. The meeting manager 162, at the first playback time, outputs the first portion of the speech audio stream 111 as a first portion of the audio output 143 to the speaker 154 and outputs the first portion of the video stream 113 to the display device 156.

The device 102 (or the server 204) is expected to transmit a media frame 411 at a second expected transmit time. The device 104 is expected to receive the media frame 411 at a second expected receive time. The interruption manager 164 of the device 104, in response to determining that no media frames of the media stream 109 have been received within a receive threshold duration of the first receive time, detects an interruption in the speech audio stream 111. For example, the interruption manager 164 determines a second time based on the first receive time and a receive threshold duration (e.g., second time=first receive time+receive threshold duration). The interruption manager 164, in response to determining that no media frames of the media stream 109 have been received between the first receive time and the second time, detects the interruption in the speech audio stream 111. The second time is subsequent to the second expected receive time of the media frame 411 and prior to an expected playback time of the media frame 411. For example, the second time is during an expected buffering interval of the media frame 411.

The device 102 (or the server 204) detects the interruption in the speech audio stream 111, as described with reference to FIGS. 1-2. The interruption manager 124 (of the device 102 or the server 204), responsive to the interruption in the speech audio stream 111, sends the text stream 121 corresponding to subsequent media frames (e.g., a set of media frames 491) to the device 104 until the interruption ends. In a particular aspect, the media frame 411 includes a second portion of the video stream 113 and a second portion of the speech audio stream 111. The interruption manager 124 (or the meeting manager 122) generates text 451 of the text stream 121 by performing speech-to-text conversion on the second portion of the speech audio stream 111 and sends the text 451 to the device 104.

The device 104 receives the text 451 of the text stream 121 from the device 102 or the server 204, as described with reference to FIGS. 1-2. The interruption manager 164, in response to the interruption, initiates playback of the text stream 121 corresponding to subsequent media frames until the interruption ends. For example, the interruption manager 164 provides the text 451 to the display device 156 at a second playback time. In a particular aspect, the second playback time is based on (e.g., the same as) the expected playback time of the media frame 411.

In a particular aspect, the meeting manager 222 of FIG. 2 is unaware of the interruption and transmits a media frame 413 of the media stream 109 to the server 204. In a particular aspect, the interruption manager 124 (of the device 102 in FIG. 1 or the server 204 in FIG. 2), in response to the interruption, halts transmission of the media frame 413 to the device 104. In a particular aspect, the media frame 413 includes a third portion of the video stream 113 and a third portion of the speech audio stream 111. The interruption manager 124 generates text 453 based on the third portion of the speech audio stream 111. The interruption manager 124 transmits the text 453 to the device 104.

The device 104 receives the text 453. The interruption manager 164, in response to the interruption, provides the text 453 to the display device 156 at a third playback time. In a particular aspect, the third playback time is based on (e.g., the same as) the expected playback time of the media frame 413.

The interruption manager 124 (of the device 102 or the server 204), in response to the interruption ending, resumes transmission of subsequent media frames (e.g., next media frames 493) of the media stream 109 to the device 104, as described with reference to FIGS. 1-2. For example, the meeting manager 122 transmits a media frame 415 to the device 104. The interruption manager 164, in response to the interruption ending, resumes playback of the media stream 109 and halts playback of the text stream 121. In a particular aspect, the media frame 415 includes a fourth portion of the video stream 113 and a fourth portion of the speech audio stream 111. The meeting manager 162, at the fourth playback time, outputs the fourth portion of the speech audio stream 111 as a portion of the audio output 143 to the speaker 154 and outputs the fourth portion of the video stream 113 to the display device 156.

As another example, the meeting manager 122 transmits a media frame 417 to the device 104. In a particular aspect, the media frame 417 includes a fifth portion of the video stream 113 and a fifth portion of the speech audio stream 111. The meeting manager 162, at the fifth playback time, outputs the fifth portion of the speech audio stream 111 as a portion of the audio output 143 to the speaker 154 and outputs the fifth portion of the video stream 113 to the display device 156.

The device 104 thus prevents information loss by playing back the text stream 121 during an interruption in the media stream 109. Playback of the media stream 109 resumes when the interruption ends.

Figure 4B:
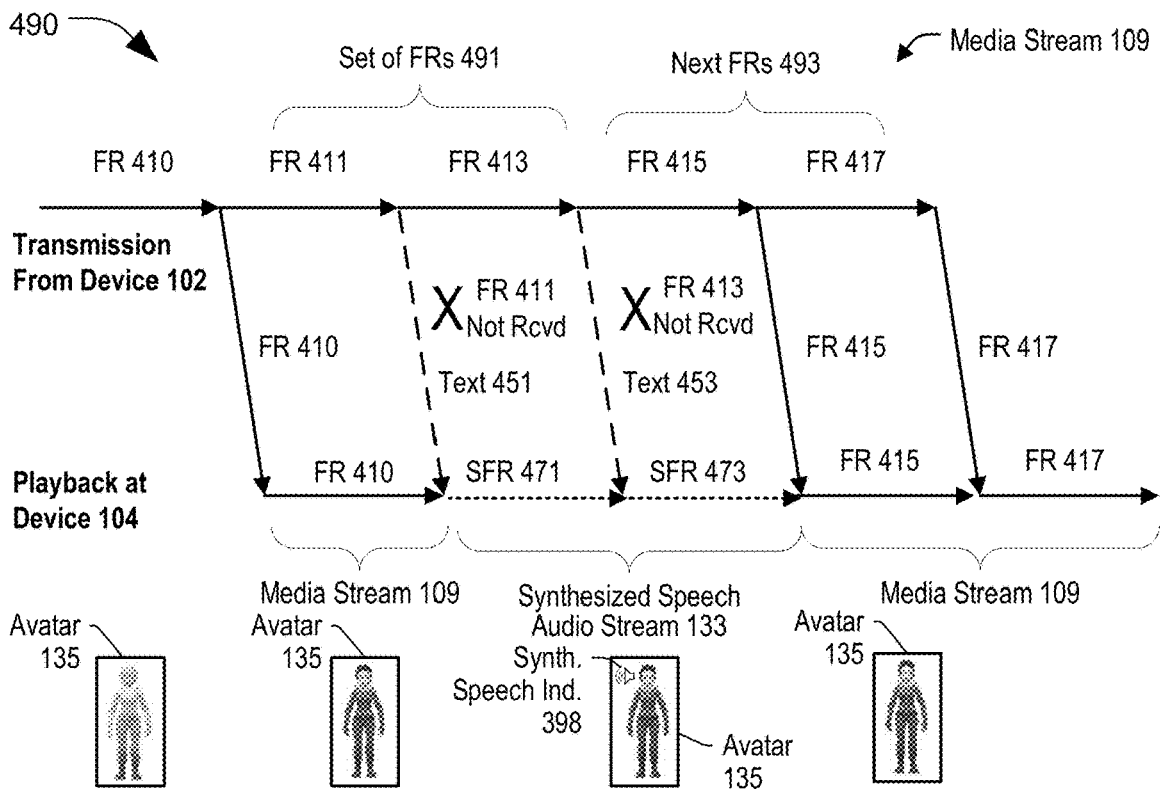
FIG. 4B is a diagram of an illustrative aspect of operations of the system of FIG. 1 or the system of FIG. 2, in accordance with some examples of the present disclosure.

Referring to FIG. 4B, a diagram of an illustrative aspect of operations of the system 100 of FIG. 1 or the system 200 of FIG. 2 is shown and generally designated 490. The timing and operations shown in FIG. 4B are for illustration and are not limiting. In other aspects, additional or fewer operations may be performed and the timing may be different.

The diagram 490 illustrates timing of transmission of media frames of the media stream 109 from the device 102. The GUI generator 168 of FIG. 1 generates the GUI 145 indicating a training level of the avatar 135. For example, the GUI 145 indicates that the avatar 135 (e.g., the speech model 131) is untrained or partially trained. The device 104 receives the media frame 410 including a first portion of the video stream 113 and a first portion of the speech audio stream 111. The meeting manager 162, at the first playback time, outputs the first portion of the speech audio stream 111 as a first portion of the audio output 143 to the speaker 154 and outputs the first portion of the video stream 113 to the display device 156, as described with reference to FIG. 4A. The interruption manager 164 trains the speech model 131 based on the media frame 410 (e.g., the first portion of the speech audio stream 111), as described with reference to FIG. 1. The GUI generator 168 updates the GUI 145 indicating an updated training level (e.g., partially trained or completely trained) of the avatar 135.

The device 104 receives the text 451 of the text stream 121 from the device 102 or the server 204, as described with reference to FIG. 4A. The interruption manager 164, in response to the interruption, halts playback of the media stream 109, halts training of the speech model 131, and initiates playback of the synthesized speech audio stream 133. For example, the interruption manager 164 generates a synthesized speech frame 471 of the synthesized speech audio stream 133 based on the text 451. To illustrate, the interruption manager 164 provides the text 451 to the text-to-speech converter 166. The text-to-speech converter 166 uses the speech model 131 to perform text-to-speech conversion on the text 451 to generate the synthesized speech frame (SFR) 471. The interruption manager 164, at the second playback time, provides the synthesized speech frame 471 as a second portion of the audio output 143. The GUI generator 168 updates the GUI 145 to include the synthesized speech indicator 398 indicating that the synthesized speech is being output. For example, the GUI 145 indicates that the avatar 135 is speaking.

The device 104 receives the text 453, as described with reference to FIG. 4A. The interruption manager 164, in response to the interruption, generates a synthesized speech frame 473 of the synthesized speech audio stream 133 based on the text 453. The interruption manager 164, at a third playback time, provides the synthesized speech frame 473 as a third portion of the audio output 143.

The interruption manager 124 (of the device 102 or the server 204), in response to the interruption ending, resumes transmission of subsequent media frames (e.g., next media frames 493) of the media stream 109 to the device 104, as described with reference to FIG. 4A. For example, the meeting manager 122 transmits the media frame 415 to the device 104. The interruption manager 164, in response to the interruption ending, resumes playback of the media stream 109, halts playback of the synthesized speech audio stream 133, and resumes training of the speech model 131. The GUI generator 168 updates the GUI 145 to remove the synthesized speech indicator 398 to indicate that the synthesized speech is not being output.

In a particular example, the meeting manager 162 plays out the media frame 415 and the media frame 417. To illustrate, the media frame 415 includes a fourth portion of the video stream 113 and a fourth portion of the speech audio stream 111. The meeting manager 162, at the fourth playback time, outputs the fourth portion of the speech audio stream 111 as a fourth portion of the audio output 143 to the speaker 154 and outputs the fourth portion of the video stream 113 to the display device 156. In a particular aspect, the meeting manager 162, at the fifth playback time, outputs the fifth portion of the speech audio stream 111 as a fifth portion of the audio output 143 to the speaker 154 and outputs the fifth portion of the video stream 113 to the display device 156.

The device 104 thus prevents information loss by playing back the synthesized speech audio stream 133 during an interruption in the media stream 109. Playback of the media stream 109 resumes when the interruption ends.

Figure 5:
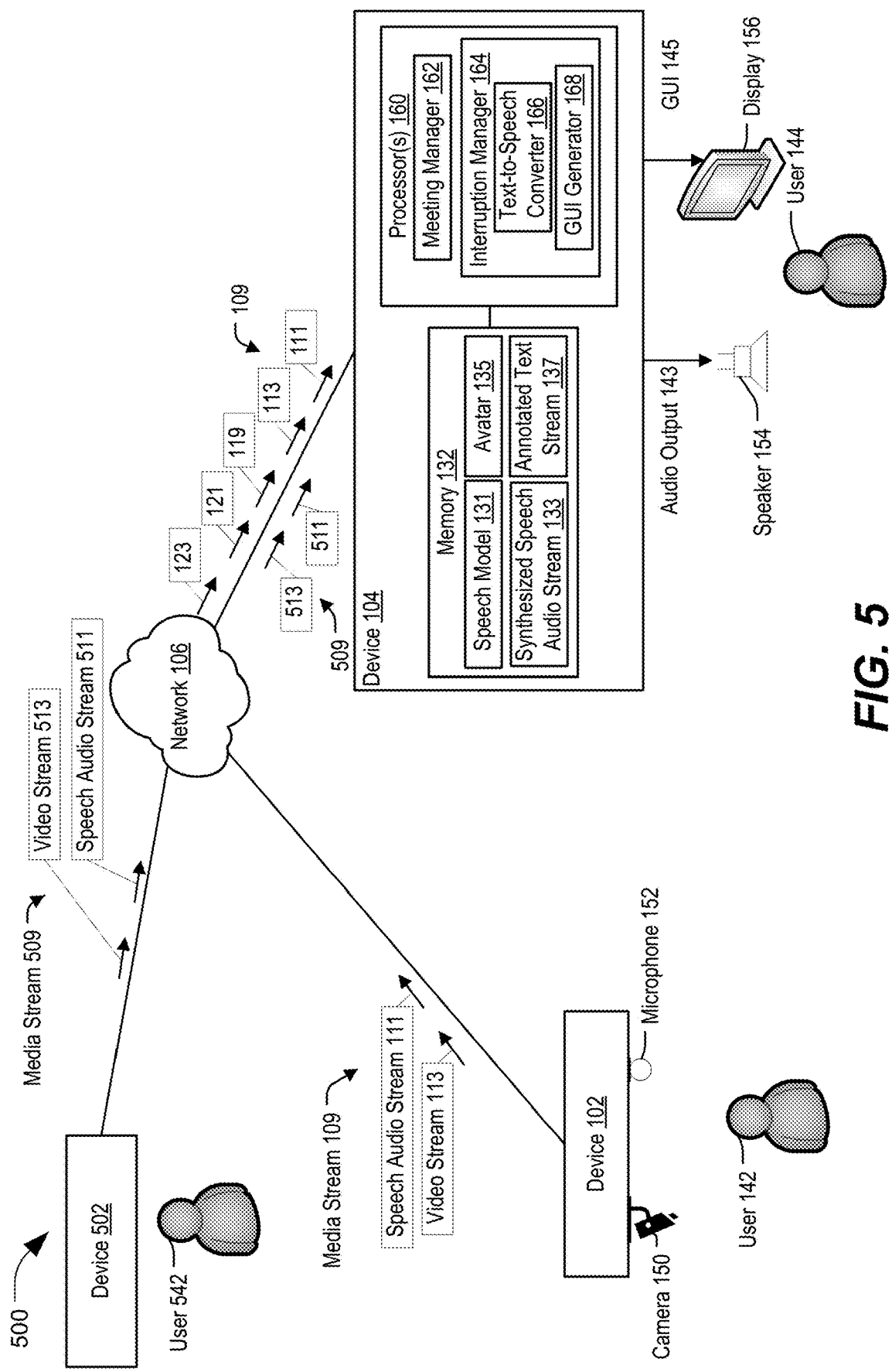
FIG. 5 is a diagram of an illustrative aspect of a system operable to handle speech audio stream interruptions, in accordance with some examples of the present disclosure.

Referring to FIG. 5, a system operable to handle speech audio stream interruptions is shown and generally designated 500. In a particular aspect, the system 100 of FIG. 1 includes one or more components of the system 500.

The system 500 includes a device 502 coupled via the network 106 to the device 104. During operation, the meeting manager 162 establishes an online meeting with multiple devices (e.g., the device 102 and the device 502). For example, the meeting manager 162 establishes an online meeting of the user 144 with the user 142 of the device 102 and a user 542 of the device 502. The device 104 receives, from the device 102 or the server 204, the media stream 109 (e.g., the speech audio stream 111, the video stream 113, or both) representing speech, images, or both, of the user 142, as described with reference to FIGS. 1-2. Similarly, the device 104 receives, from the device 502 or a server (e.g., the server 204 or another server), a media stream 509 (e.g., a second speech audio stream 511, a second video stream 513, or both) representing speech, images, or both, of the user 542.

The meeting manager 162 plays out the media stream 109 concurrently with playing out the media stream 509, as further described with reference to FIG. 6A. For example, the meeting manager 162 provides the video stream 113 to the display device 156 concurrently with providing the second video stream 513 to the display device 156. To illustrate, the user 144 can view images of the user 142 concurrently with viewing images of the user 542 during the online meeting. As another example, the meeting manager 162 provides the speech audio stream 111, the second speech audio stream 511, or both, as the audio output 143 to the speaker 154. To illustrate, the user 144 can hear the speech of the user 142, the speech of the user 542, or both. In a particular aspect, the interruption manager 164 trains the speech model 131 based on the speech audio stream 111, as described with reference to FIG. 1. Similarly, the interruption manager 164 trains a second speech model of the user 542 based on the second speech audio stream 511.

In a particular example, the device 104 continues to receive the media stream 509 during an interruption of the speech audio stream 111. The interruption manager 164 plays out the media stream 509 concurrently with playing out the synthesized speech audio stream 133, the text stream 121, the annotated text stream 137, or a combination thereof, as further described with reference to FIG. 6C. For example, the interruption manager 164 provides the second speech audio stream 511 concurrently with generating the synthesized speech audio stream 133 and providing the synthesized speech audio stream 133 to the speaker 154. As another example, the interruption manager 164 provides the second video stream 513 to the display device 156 concurrently with generating updates to the GUI 145 including the text stream 121 or the annotated text stream 137 and providing the updates of the GUI 145 to the display device 156. The user 144 can thus follow a conversation between the user 142 and the user 542 during the interruption of the speech audio stream 111.

In a particular aspect, an interruption in the media stream 509 overlaps the interruption of the speech audio stream 111. The interruption manager 164 receives a second text stream, a second metadata stream, or both, corresponding to the second speech audio stream 511. In a particular aspect, the interruption manager 164 generates a second annotated text stream based on the second text stream, the second metadata stream, or both. The interruption manager 164 generates a second synthesized speech audio stream by using the second speech model to perform text-to-speech conversion based on the second text stream, the second metadata stream, the second annotated text stream, or a combination thereof. The interruption manager 164 plays out the second speech audio stream 511 to the speaker 154 concurrently with playing out the synthesized speech audio stream 133. In a particular aspect, the interruption manager 164 plays out the text stream 121, the annotated text stream 137, or both, concurrently with playing out the second text stream, the second annotated text stream, or both, to the display device 156. The user 144 can thus follow a conversation between the user 142 and the user 542 during the interruption of the speech audio stream 111 and the second speech audio stream 511.

The system 500 thus reduces (e.g., eliminates) information loss during an interruption of one or more speech audio streams (e.g., the speech audio stream 111, the second speech audio stream 511, or both) during an online meeting with multiple users. For example, the user 144 continues to receive audio, text, or a combination thereof, corresponding to speech of the user 142 and the speech of the user 542 in cases where text can be received by the device 104 although network issues prevent one or more speech audio streams from being received by the device 104.

Figure 6A:
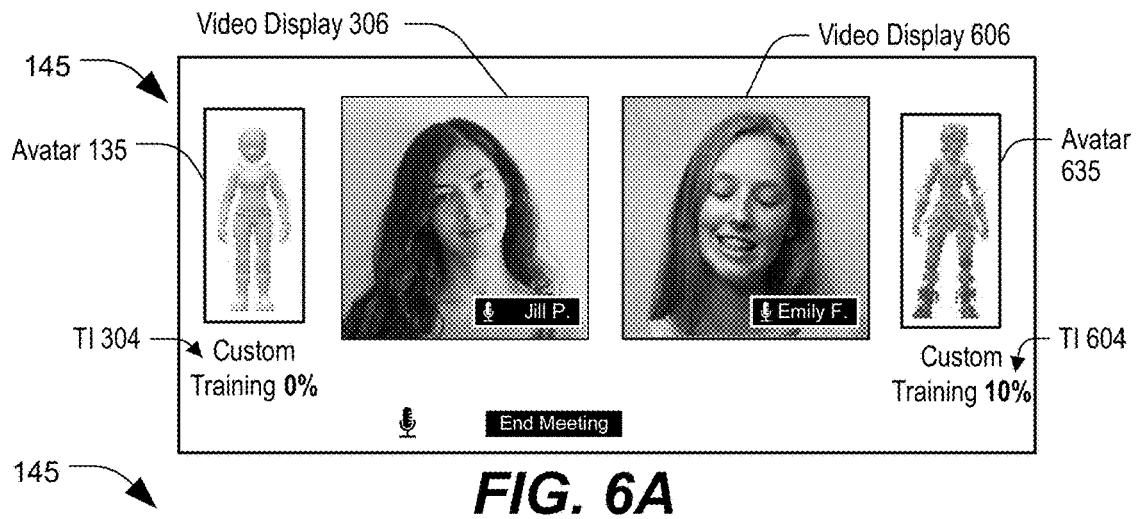
FIG. 6A is a diagram of an illustrative graphical user interface (GUI) generated by the system of FIG. 5, in accordance with some examples of the present disclosure.

Referring to FIG. 6A, an example of the GUI 145 is shown. In a particular aspect, the GUI 145 is generated by the system 500 of FIG. 5.

The GUI 145 includes video display, an avatar, a training indicator, or a combination thereof, for multiple participants of an online meeting. For example, the GUI 145 includes the video display 306, the avatar 135, the training indicator 304, or a combination thereof, for the user 142, as described with reference to FIG. 3A. The GUI 145 also includes a video display 606, an avatar 635, a training indicator (TI) 604, or a combination thereof, for the user 542. For example, the GUI generator 168 generates the GUI 145 during a beginning of an online meeting. The second video stream 513 (e.g., images of the user 542 (e.g., Emily F.)) of the media stream 509 is displayed via the video display 606 concurrently with display of the video stream 113 (e.g., images of the user 142 (e.g., Jill P.)) via the video display 306.

The training indicator 304 indicates a training level (e.g., 0% or untrained) of the speech model 131 and the training indicator 604 indicates a training level (e.g., 10% or partially trained) of the second speech model. The training levels of the speech models can differ if one user speaks more than the other user or if speech of one user includes a greater variety of sounds (e.g., model coverage is higher).

In a particular aspect, a representation (e.g., a solid color) of the avatar 135 and a representation (e.g., partially colored) of the avatar 635 also indicates the training level of the respective speech models. In a particular aspect, the representation of the avatar 135 and the representation of the avatar 635 indicates that synthesized speech is not being output. For example, the GUI 145 does not include any synthesized speech indicators.

In a particular implementation, if an interruption occurs in receiving the media stream 109, the text-to-speech converter 166 generates the synthesized speech audio stream 133 using the speech model 131 (e.g., a non-customized generic speech model). If an interruption occurs in receiving the media stream 509, the text-to-speech converter 166 generates a second synthesized speech audio stream using the second speech model (e.g., a partially-customized speech model). In a particular aspect, the interruption manager 164 initializes the second speech model based on a second generic speech model that is distinct from a first generic speech model used to initialize the speech model 131 so that synthesized speech for the user 142 is distinguishable from synthesized speech for the user 542 if an interruption occurs prior to training (or complete training) of the speech model 131 and the second speech model. In a particular aspect, the speech model 131 is initialized using a first generic speech model associated with demographic data of the user 142 and the second speech model is initialized using a second generic speech model associated with demographic data of the user 542.

Figure 6B:
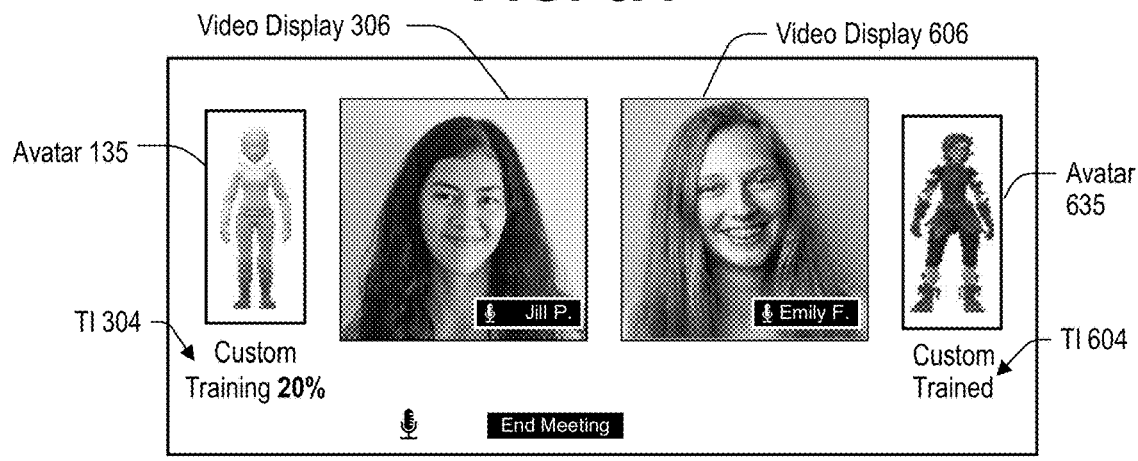
FIG. 6B is a diagram of an illustrative GUI generated by the system of FIG. 5, in accordance with some examples of the present disclosure.

Referring to FIG. 6B, an example of the GUI 145 is shown. In a particular aspect, the GUI 145 is generated by the system 500 of FIG. 5.

In a particular example, the GUI generator 168 updates the GUI 145 during the online meeting. For example, the training indicator 304 indicates a second training level (e.g., 20% or partially trained) of the speech model 131 and a second training level (e.g., 100% or completely trained) of the second speech model.

Figure 6C:
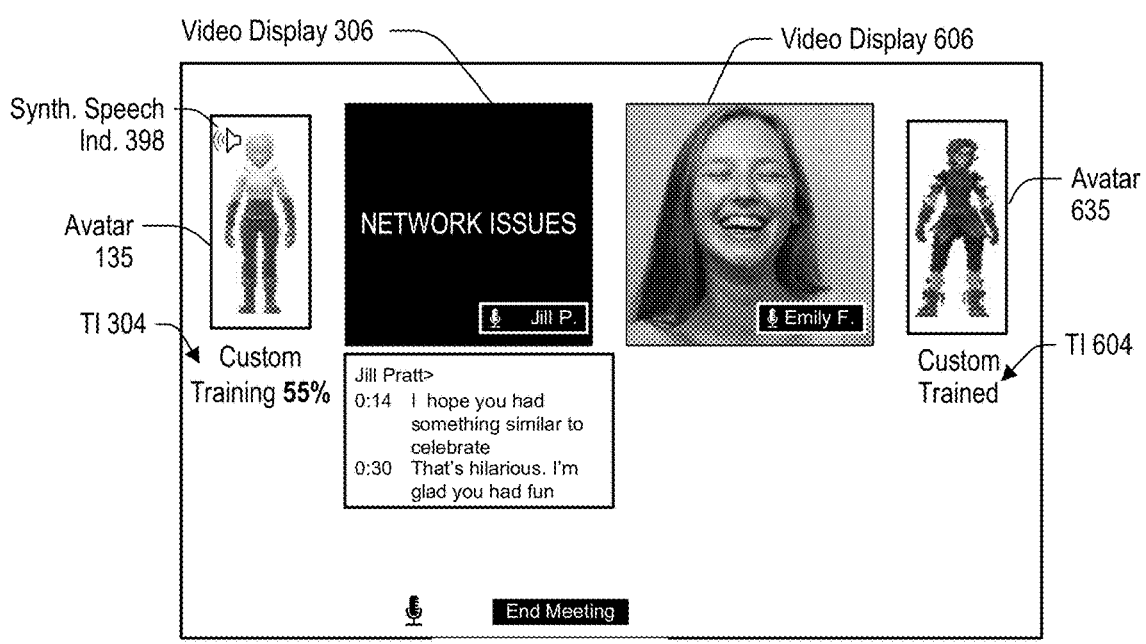
FIG. 6C is a diagram of an illustrative GUI generated by the system of FIG. 5, in accordance with some examples of the present disclosure.

Referring to FIG. 6C, an example of the GUI 145 is shown. In a particular aspect, the GUI 145 is generated by the system 500 of FIG. 5.

In a particular example, the GUI generator 168 updates the GUI 145 in response to an interruption in receiving the media stream 109. The training indicator 304 indicates a third training level (e.g., 55% or partially training) of the speech model 131 and the training indicator 604 indicates a third training level (e.g., 100% or completely trained) of the second speech model. In a particular aspect, the representation of the avatar 135 indicates that synthesized speech is being output. For example, the GUI 145 includes a synthesized speech indicator 398. The representation of the avatar 635 indicates that synthesized speech is not being output for the user 542. For example, the GUI 145 does not include a synthesized speech indicator associated with the avatar 635.

The interruption manager 164, in response to the interruption, halts output of the video stream 113. For example, the video display 306 indicates that output of the video stream 113 has been halted due to an interruption (e.g., network issues). The interruption manager 164 outputs the text stream 121 via the text display 396 in response to the interruption.

In a particular aspect, the text stream 121 is displayed in real-time so that the user 144 can continue to follow and participate in the conversation. For example, the user 144 can hear from the synthesized speech audio stream 133, read on the text display 396, or both, that the user 142 made a first statement (e.g., "I hope you had something similar to celebrate"). The user 144 can hear the reply from the user 542 in the second speech audio stream of the media stream 509 output by the speaker 154. The user 144 can hear from the synthesized speech audio stream 133, read on the text display 396, or both, that the user 142 made a second statement (e.g., "That's hilarious. I'm glad you had fun"). The user 144 can thus hear audio from a synthesized speech audio stream, read text of a text stream, or both, for one or more participants of an online meeting while receiving a media stream for one or more other participants of the online meeting.

Figure 7A:
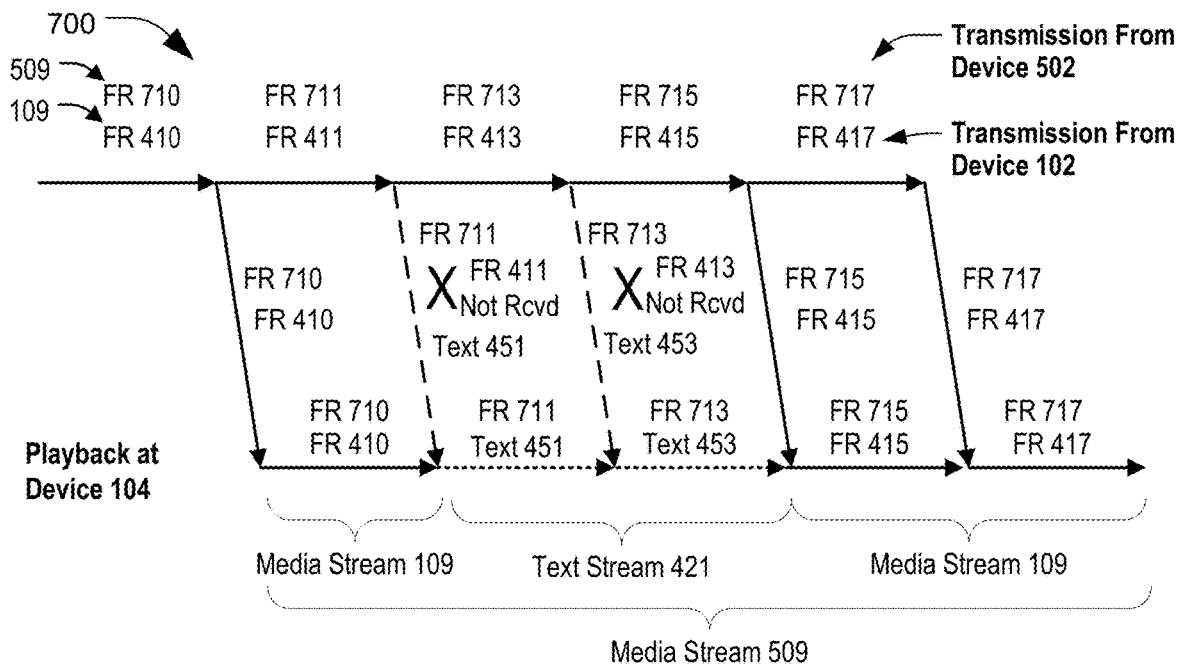
FIG. 7A is a diagram of an illustrative aspect of operations of the system of FIG. 5, in accordance with some examples of the present disclosure.

Referring to FIG. 7A, a diagram of an illustrative aspect of operations of the system 500 of FIG. 5 is shown and generally designated 700. The timing and operations shown in FIG. 7A are for illustration and are not limiting. In other aspects, additional or fewer operations may be performed and the timing may be different.

The diagram 700 illustrates timing of transmission of media frames of the media stream 109 from the device 102 and the media stream 509 from the device 502. In a particular aspect, the media frames of the media stream 109 are transmitted from the device 102 or the server 204 to the device 104, as described with reference to FIGS. 1-2.

Similarly, the media frames of the media stream 509 are transmitted from the device 502 or a server (e.g., the server 204 or another server) to the device 104.

The device 104 receives the media frame 410 of the media stream 109 and a media frame 710 of the media stream 509, and provides the media frame 410 and the media frame 710 for playback. For example, the meeting manager 162 outputs a first portion of the speech audio stream 111 (e.g., indicated by the media frame 410) and a first portion of the second speech audio stream (e.g., indicated by the media frame 710) as the audio output 143 to the speaker 154, outputs a first portion of the video stream 113 (e.g., indicated by the media frame 410) via the video display 306, and outputs a first portion of the second video stream (e.g., indicated by the media frame 710) via the video display 606, as described with reference to FIG. 6A.

The device 104, during the interruption of the media stream 109, receives the text 451 (corresponding to the media frame 411) of the text stream 121, as described with reference to FIG. 4A. The device 104 receives a media frame 711 of the media stream 509. The interruption manager 164, in response to the interruption, initiates playback of the text stream 121 corresponding to subsequent media frames of the media stream 109 until the interruption ends concurrently with playback of the media stream 509. For example, the interruption manager 164 provides the text 451 (e.g., indicated by the media frame 411) to the display device 156 concurrently with providing the media frame 711 for playback.

The device 104, during the interruption of the media stream 109, receives the text 453 (corresponding to the media frame 413) of the text stream 121, as described with reference to FIG. 4A. The device 104 receives a media frame 713 of the media stream 509. The interruption manager 164 provides the text 453 to the display device 156 concurrently with providing the media frame 713 for playback.

The interruption manager 164, in response to the interruption ending, resumes playback of the media stream 109 and halts playback of the text stream 121, as described with reference to FIG. 4A. The meeting manager 162 receives and plays back the media frame 415 and a media frame 715. Similarly, the meeting manager 162 receives and plays back the media frame 417 and a media frame 717.

The device 104 thus prevents information loss by playing back the text stream 121 during an interruption in the media stream 109 concurrently with playback of the media stream 509. Playback of the media stream 109 resumes when the interruption ends.

Figure 7B:
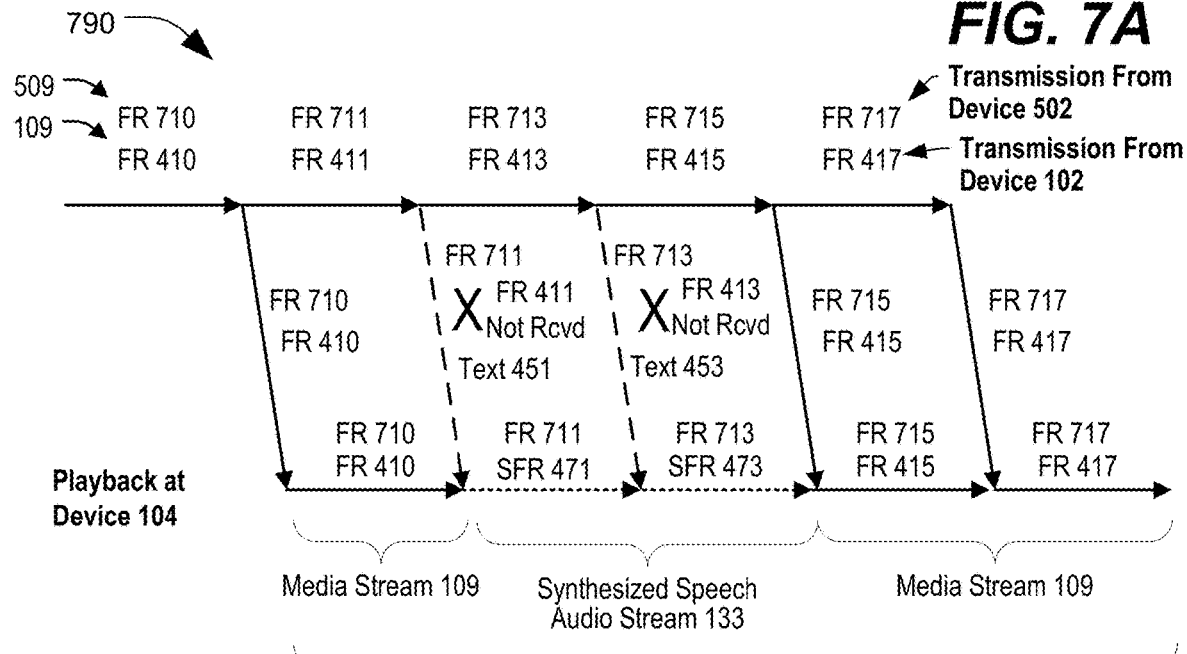
FIG. 7B is a diagram of an illustrative aspect of operations of the system of FIG. 5, in accordance with some examples of the present disclosure.
Figure 7B:
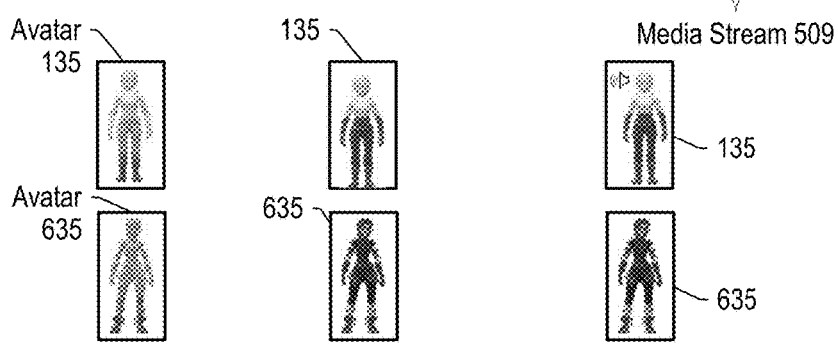

Referring to FIG. 7B, a diagram of an illustrative aspect of operations of the system 500 of FIG. 5 is shown and generally designated 790. The timing and operations shown in FIG. 7B are for illustration and are not limiting. In other aspects, additional or fewer operations may be performed and the timing may be different.

The diagram 790 illustrates timing of transmission of media frames of the media stream 109 from the device 102 and the media stream 509 from the device 502. The GUI generator 168 of FIG. 1 generates the GUI 145 indicating a training level of the avatar 135 and a training level of the avatar 635. For example, the GUI 145 indicates that the avatar 135 (e.g., the speech model 131) is untrained and the avatar 635 (e.g., the second speech model) is partially trained. The device 104 receives and plays back the media frame 410 and the media frame 710. The interruption manager 164 trains the speech model 131 based on the media frame 410, as described with reference to FIG. 4B, and trains the second speech model based on the media frame 710. The GUI generator 168 updates the GUI 145 indicating an updated training level (e.g., partially trained) of the avatar 135 and updated training level (e.g., completely trained) of the avatar 635.

The device 104 receives the text 451 of the text stream 121 and the media frame 711. The interruption manager 164 generates the synthesized speech frame 471 based on the text 451, as described with reference to FIG. 4B. The interruption manager 164 plays back the synthesized speech frame 471 and the media frame 711. The GUI generator 168 updates the GUI 145 to include the synthesized speech indicator 398 indicating that the synthesized speech is being output for the user 142. For example, the GUI 145 indicates that the avatar 135 is speaking. The GUI 145 does not include a synthesized speech indicator for the user 542 (e.g., the avatar 635 is not indicated as speaking).

The device 104 receives the text 453 and the media frame 713. The interruption manager 164 generates the synthesized speech frame 473 based on the text 453, as described with reference to FIG. 4B. The interruption manager 164 plays back the synthesized speech frame 473 and the media frame 417.

The interruption manager 164, in response to the interruption ending, resumes playback of the media stream 109, halts playback of the synthesized speech audio stream 133, and resumes training of the speech model 131, as described with reference to FIG. 4B. The GUI generator 168 updates the GUI 145 to remove the synthesized speech indicator 398 to indicate that the synthesized speech is not being output.

In a particular example, the meeting manager 162 receives and plays out the media frame 415 and the media frame 715. As another example, the meeting manager 162 receives and plays out the media frame 417 and the media frame 717.

The device 104 thus prevents information loss by playing back the synthesized speech audio stream 133 during an interruption in the media stream 109 concurrently with playing out the media stream 509. Playback of the media stream 109 resumes when the interruption ends.

Figure 8:
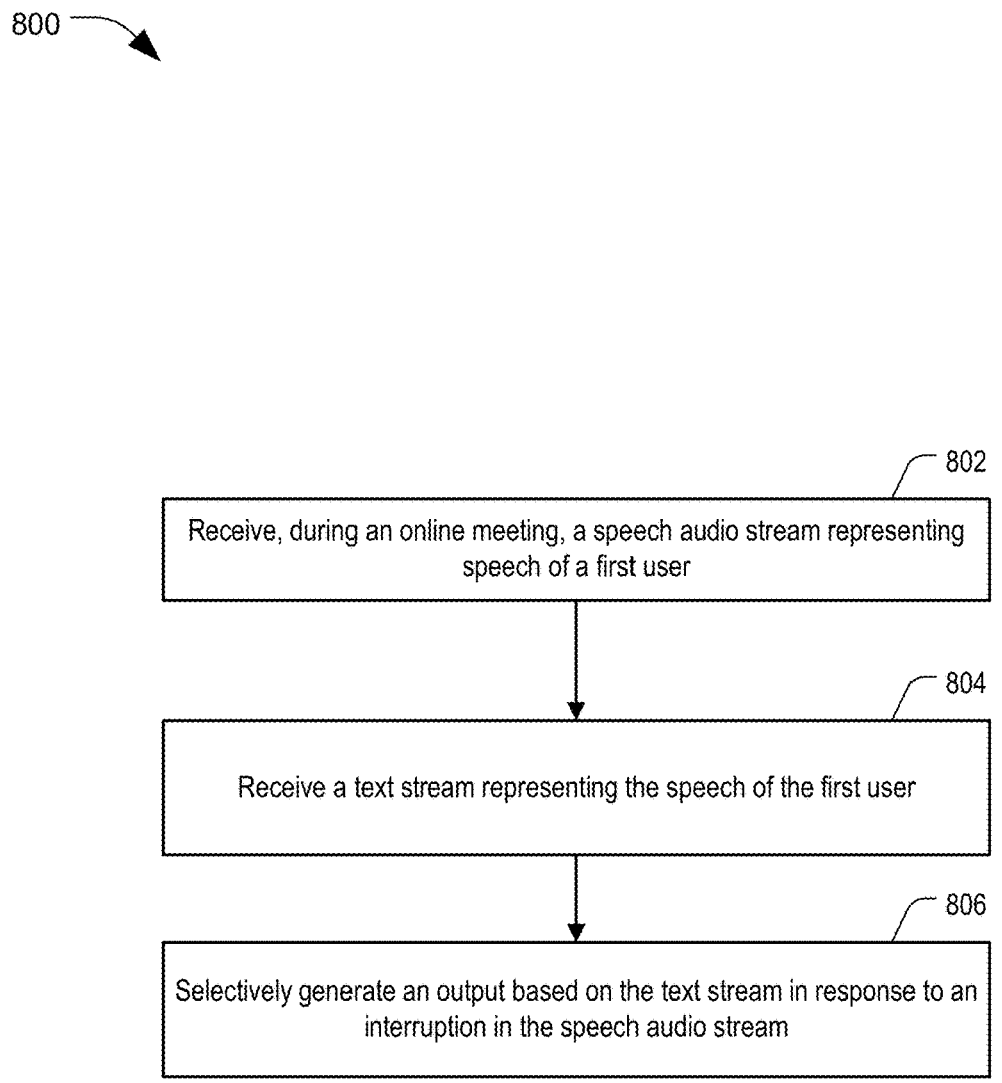
FIG. 8 is diagram of a particular implementation of a method of handling speech audio stream interruptions that may be performed by any of the systems of FIGS. 1, 2, or 5, in accordance with some examples of the present disclosure.

Referring to FIG. 8, a particular implementation of a method 800 of handling speech audio stream interruptions is shown. In a particular aspect, one or more operations of the method 800 are performed by the meeting manager 162, the interruption manager 164, the one or more processors 160, the device 104, the system 100 of FIG. 1, or a combination thereof.

The method 800 includes receiving, during an online meeting, a speech audio stream representing speech of a first user, at 802. For example, the device 104 of FIG. 1 receives, during an online meeting, the speech audio stream 111 representing speech of the user 142, as described with reference to FIG. 1.

The method 800 also includes receiving a text stream representing the speech of the first user, at 804. For example, the device 104 of FIG. 1 receives the text stream 121 representing speech of the user 142, as described with reference to FIG. 1.

The method 800 further includes selectively generating an output based on the text stream in response to an interruption in the speech audio stream, at 806. For example, the interruption manager 164 of FIG. 1 selectively generates the synthesized speech audio stream 133 based on the text stream 121 in response to an interruption in the speech audio stream 111, as described with reference to FIG. 1. In a particular implementation, the interruption manager 164 selectively outputs the text stream 121, the annotated text stream 137, or both, in response to the interruption in the speech audio stream 111, as described with reference to FIG. 1.

The method 800 improves thus reduces (e.g., eliminates) information loss during an interruption of the speech audio stream 111 during an online meeting. For example, the user 144 continues to receive audio (e.g., synthesized speech audio stream 133), text (e.g., the text stream 121, the annotated text stream 137, or both), or a combination thereof, corresponding to speech of the user 142 in cases where text can be received by the device 104 although network issues prevent the speech audio stream 111 from being received by the device 104.

The method 800 of FIG. 8 may be implemented by a field-programmable gate array (FPGA) device, an application-specific integrated circuit (ASIC), a processing unit such as a central processing unit (CPU), a DSP, a controller, another hardware device, firmware device, or any combination thereof. As an example, the method 800 of FIG. 8 may be performed by a processor that executes instructions, such as described with reference to FIG. 18.

Figure 9:
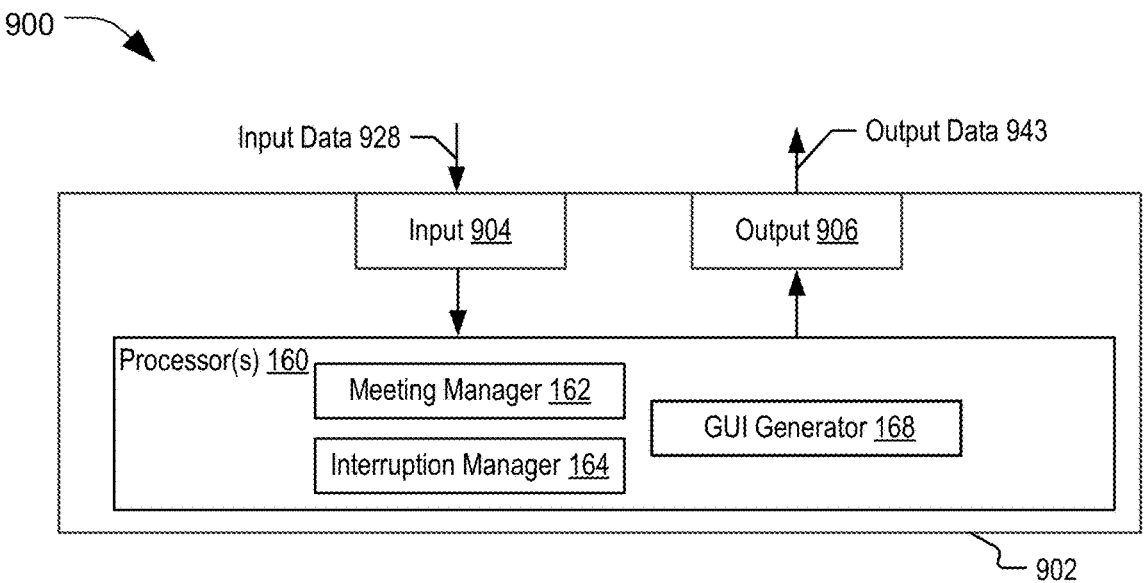
FIG. 9 illustrates an example of an integrated circuit operable to handle speech audio stream interruptions, in accordance with some examples of the present disclosure.
Figure 13:
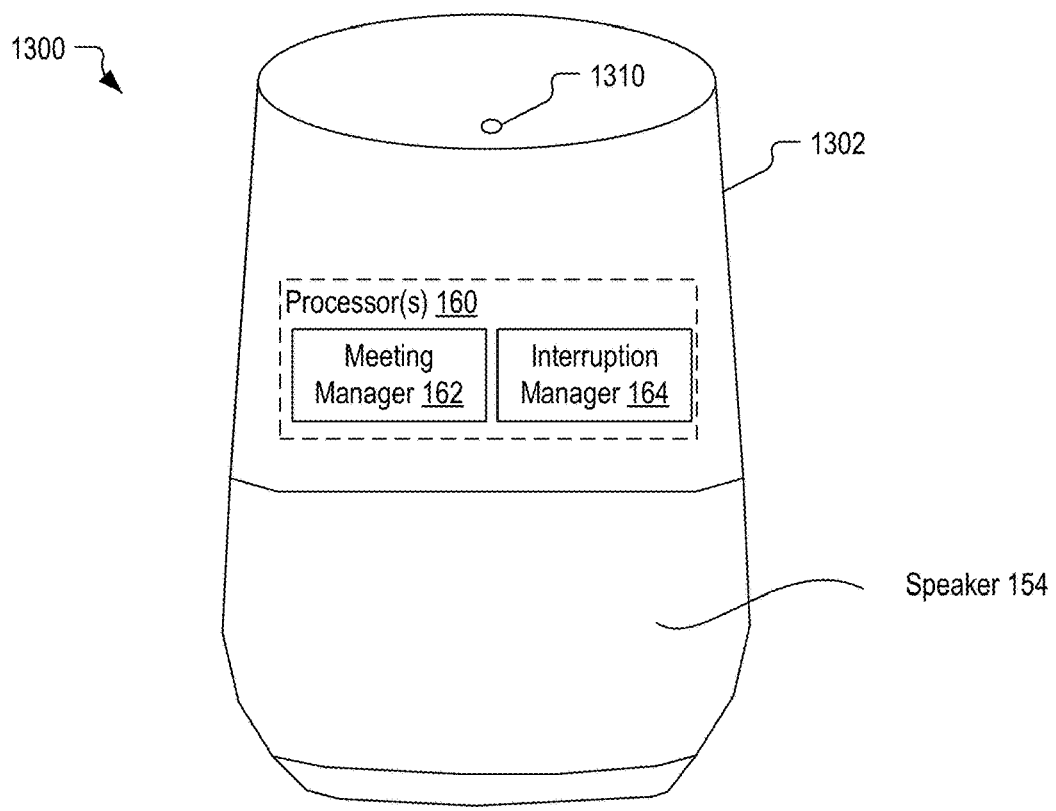
FIG. 13 is a diagram of a voice-controlled speaker system operable to handle speech audio stream interruptions, in accordance with some examples of the present disclosure.
Figure 14:
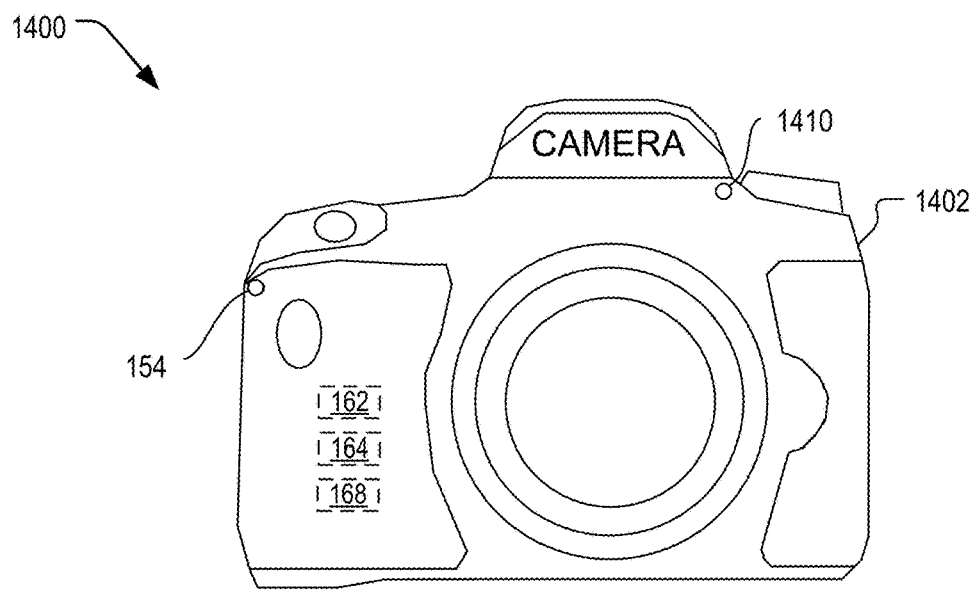
FIG. 14 is a diagram of a camera operable to handle speech audio stream interruptions, in accordance with some examples of the present disclosure.
Figure 15:
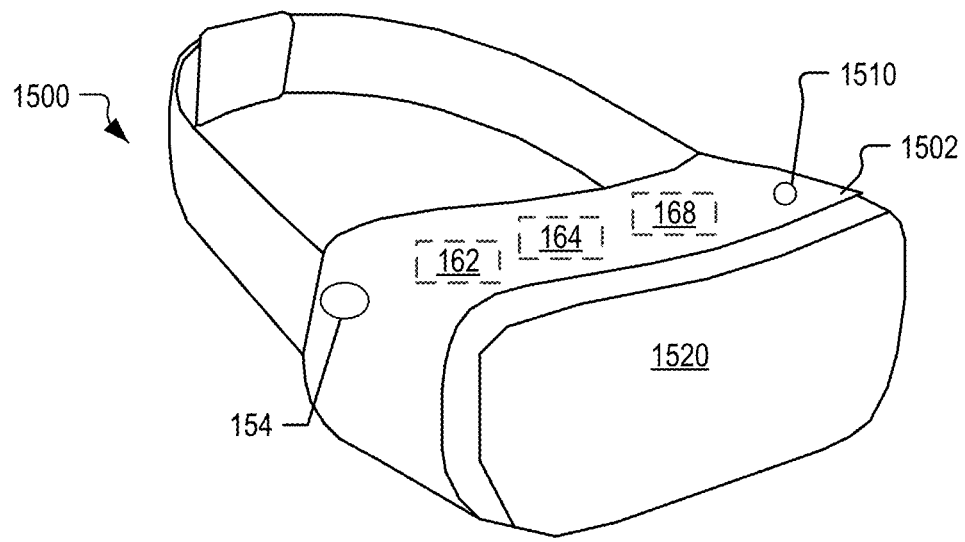
FIG. 15 is a diagram of a headset, such as a virtual reality or augmented reality headset, operable to handle speech audio stream interruptions, in accordance with some examples of the present disclosure.
Figure 16:
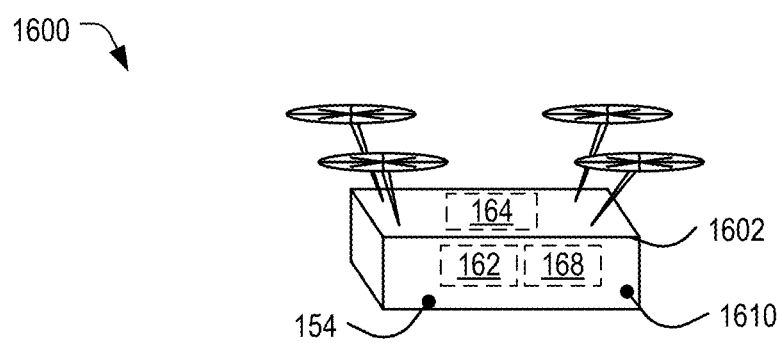
FIG. 16 is a diagram of a first example of a vehicle operable to handle speech audio stream interruptions, in accordance with some examples of the present disclosure.
Figure 17:
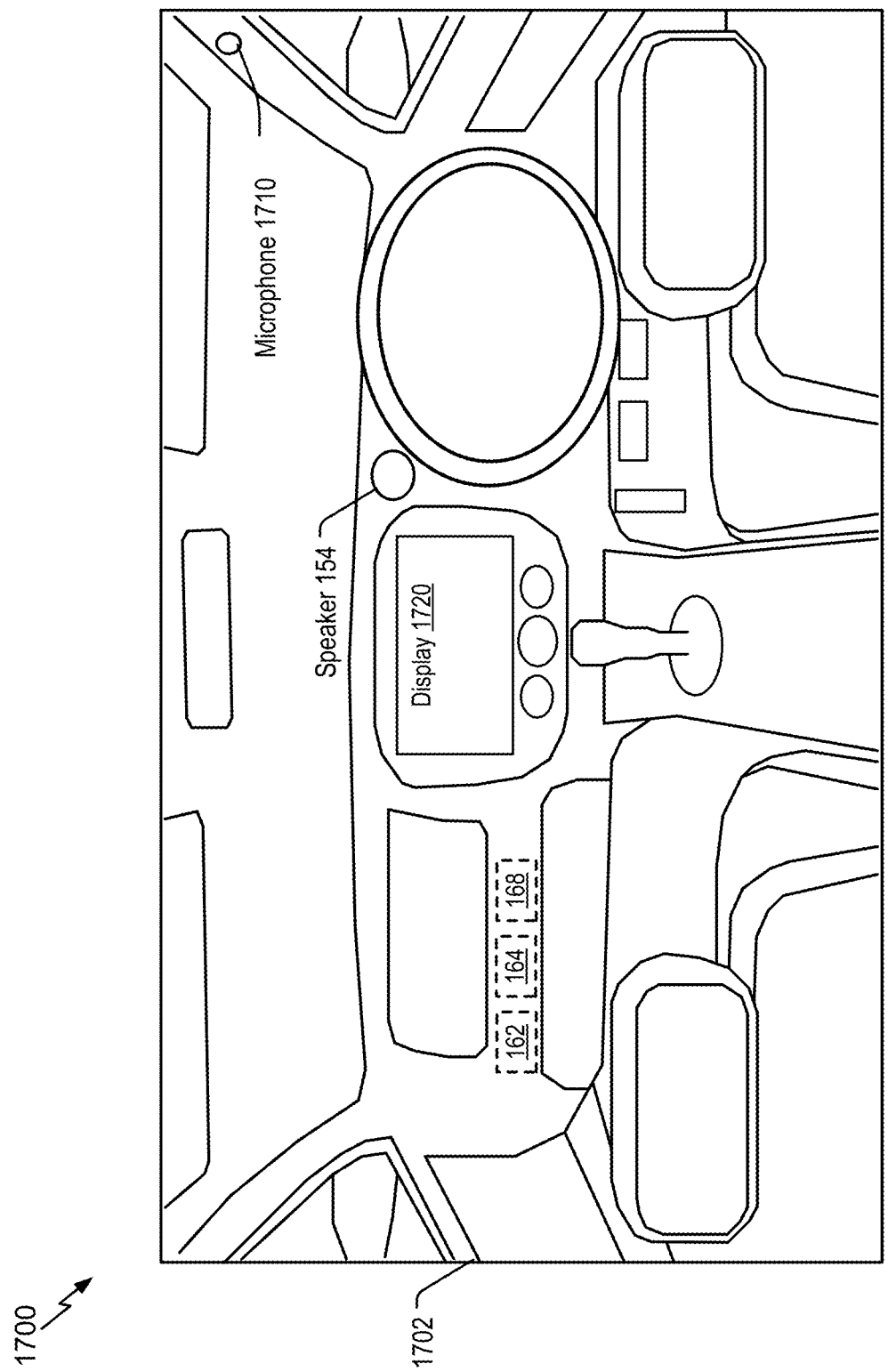
FIG. 17 is a diagram of a second example of a vehicle operable to handle speech audio stream interruptions, in accordance with some examples of the present disclosure.

FIG. 9 depicts an implementation 900 of the device 104 as an integrated circuit 902 that includes the one or more processors 160. The integrated circuit 902 also includes an input 904 (e.g., one or more bus interfaces) to enable input data 928 (e.g., the speech audio stream 111, the video stream 113, the media stream 109, the interruption notification 119, the text stream 121, the metadata stream 123, the media stream 509, or a combination thereof) to be received for processing. The integrated circuit 902 also includes an output 906 (e.g., a bus interface) to enable sending of an output signal (e.g., the speech audio stream 111, the synthesized speech audio stream 133, the audio output 143, the video stream 113, the text stream 121, the annotated text stream 137, the GUI 145, or a combination thereof). The integrated circuit 902 enables implementation of handling speech audio stream interruptions as a component in a system, such as a mobile phone or tablet as depicted in FIG. 10, a headset as depicted in FIG. 11, a wearable electronic device as depicted in FIG. 12, a voice-controlled speaker system as depicted in FIG. 13, a camera as depicted in FIG. 14, a virtual reality headset or an augmented reality headset as depicted in FIG. 15, or a vehicle as depicted in FIG. 16 or FIG. 17.

Figure 10:
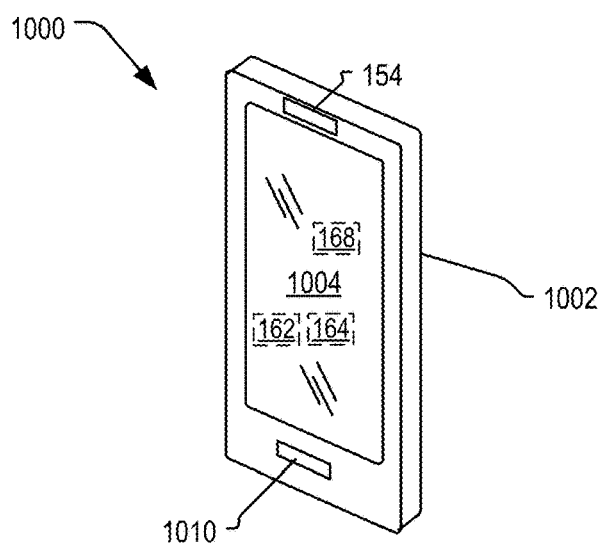
FIG. 10 is a diagram of a mobile device operable to handle speech audio stream interruptions, in accordance with some examples of the present disclosure.

FIG. 10 depicts an implementation 1000 in which the device 104 includes a mobile device 1002, such as a phone or tablet, as illustrative, non-limiting examples. The mobile device 1002 includes a microphone 1010, the speaker 154, and a display screen 1004. Components of the one or more processors 160, including the meeting manager 162, the interruption manager 164, the GUI generator 168, or a combination thereof, are integrated in the mobile device 1002 and are illustrated using dashed lines to indicate internal components that are not generally visible to a user of the mobile device 1002. In a particular example, the meeting manager 162 outputs the speech audio stream 111 or the interruption manager 164 outputs the synthesized speech audio stream 133, which is then processed to perform one or more operations at the mobile device 1002, such as to launch a graphical user interface or otherwise display other information associated with the user's speech at the display screen 1004 (e.g., via an integrated "smart assistant" application).

Figure 11:
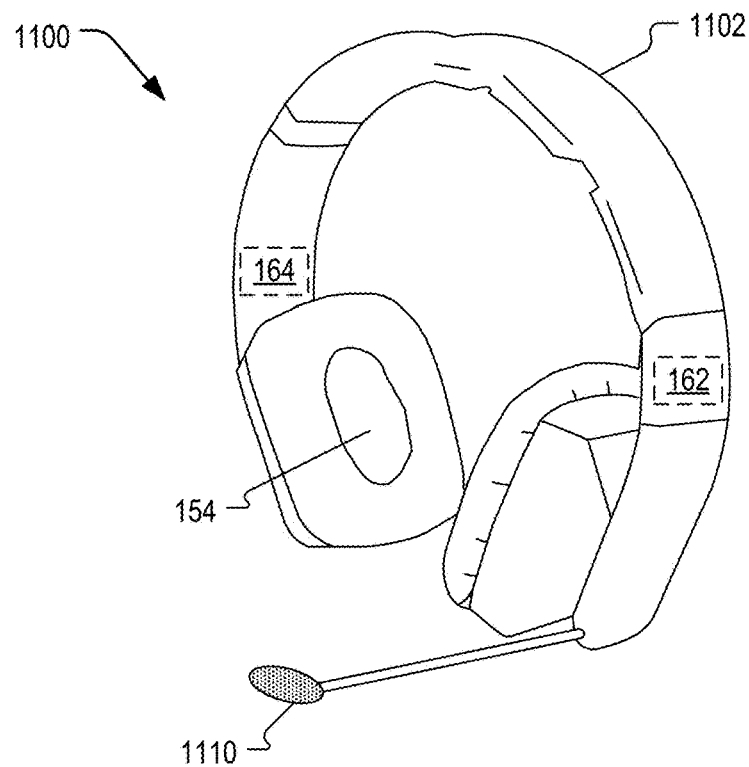
FIG. 11 is a diagram of a headset operable to handle speech audio stream interruptions, in accordance with some examples of the present disclosure.

FIG. 11 depicts an implementation 1100 in which the device 104 includes a headset device 1102. The headset device 1102 includes the speaker 154, a microphone 1110, or both. Components of the one or more processors 160, including the meeting manager 162, the interruption manager 164, or both, are integrated in the headset device 1102. In a particular example, the meeting manager 162 outputs the speech audio stream 111 or the interruption manager 164 outputs the synthesized speech audio stream 133, which may cause the headset device 1102 to perform one or more operations at the headset device 1102 to transmit audio data corresponding to the user speech to a second device (not shown) for further processing.

Figure 12:
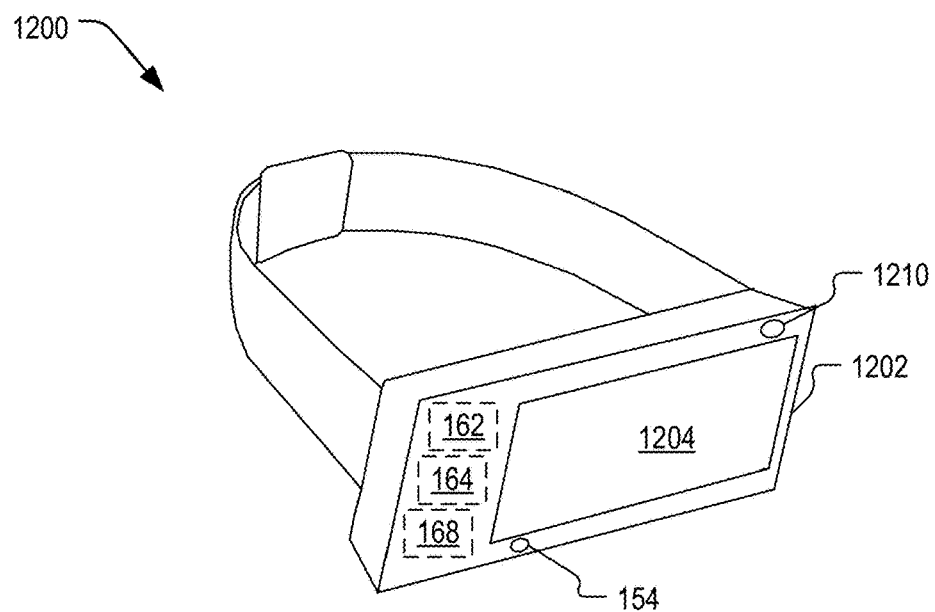
FIG. 12 is a diagram of a wearable electronic device operable to handle speech audio stream interruptions, in accordance with some examples of the present disclosure.

FIG. 12 depicts an implementation 1200 in which the device 104 includes a wearable electronic device 1202, illustrated as a "smart watch." The meeting manager 162, the interruption manager 164, the GUI generator 168, the speaker 154, a microphone 1210, or a combination thereof, are integrated into the wearable electronic device 1202. In a particular example, the meeting manager 162 outputs the speech audio stream 111 or the interruption manager 164 outputs the synthesized speech audio stream 133, which is then processed to perform one or more operations at the wearable electronic device 1202, such as to launch the GUI 145 or otherwise display other information associated with the user's speech at a display screen 1204 of the wearable electronic device 1202. To illustrate, the wearable electronic device 1202 may include a display screen that is configured to display a notification based on user speech detected by the wearable electronic device 1202. In a particular example, the wearable electronic device 1202 includes a haptic device that provides a haptic notification (e.g., vibrates) in response to detection of user speech. For example, the haptic notification can cause a user to look at the wearable electronic device 1202 to see a displayed notification indicating detection of a keyword spoken by the user. The wearable electronic device 1202 can thus alert a user with a hearing impairment or a user wearing a headset that the user's speech is detected.

FIG. 13 is an implementation 1300 in which the device 104 includes a wireless speaker and voice activated device 1302. The wireless speaker and voice activated device 1302 can have wireless network connectivity and is configured to execute an assistant operation. The one or more processors 160 including the meeting manager 162, the interruption manager 164, or both, the speaker 154, a microphone 1310, or a combination thereof, are included in the wireless speaker and voice activated device 1302. During operation, in response to receiving a verbal command identified as user speech in the speech audio stream 111 output by the meeting manager 162 or in the synthesized speech audio stream 133 output by the interruption manager 164, the wireless speaker and voice activated device 1302 can execute assistant operations, such as via execution of a voice activation system (e.g., an integrated assistant application). The assistant operations can include creating a calendar event, adjusting a temperature, playing music, turning on lights, etc. For example, the assistant operations are performed responsive to receiving a command after a keyword or key phrase (e.g., "hello assistant").

FIG. 14 depicts an implementation 1400 in which the device 104 includes a portable electronic device that corresponds to a camera device 1402. The meeting manager 162, the interruption manager 164, the GUI generator 168, the speaker 154, a microphone 1410, or a combination thereof, are included in the camera device 1402. During operation, in response to receiving a verbal command identified as user speech in the speech audio stream 111 output by the meeting manager 162 or in the synthesized speech audio stream 133 output by the interruption manager 164, the camera device 1402 can execute operations responsive to spoken user commands, such as to adjust image or video capture settings, image or video playback settings, or image or video capture instructions, as illustrative examples.

FIG. 15 depicts an implementation 1500 in which the device 104 includes a portable electronic device that corresponds to a virtual reality, augmented reality, or mixed reality headset 1502. The meeting manager 162, the interruption manager 164, the GUI generator 168, the speaker 154, a microphone 1510, or a combination thereof, are integrated into the headset 1502. User speech detection can be performed based on the speech audio stream 111 output by the meeting manager 162 or the synthesized speech audio stream 133 output by the interruption manager 164. A visual interface device is positioned in front of the user's eyes to enable display of augmented reality or virtual reality images or scenes to the user while the headset 1502 is worn. In a particular example, the visual interface device is configured to display a notification indicating user speech detected in an audio stream. In another example, the visual interface device is configured to display the GUI 145.

FIG. 16 depicts an implementation 1600 in which the device 104 corresponds to, or is integrated within, a vehicle 1602, illustrated as a manned or unmanned aerial device (e.g., a package delivery drone). The meeting manager 162, the interruption manager 164, the GUI generator 168, the speaker 154, a microphone 1610, or a combination thereof, are integrated into the vehicle 1602. User speech detection can be performed based on the speech audio stream 111 output by the meeting manager 162 or the synthesized speech audio stream 133 output by the interruption manager 164, such as for delivery instructions from an authorized user of the vehicle 1602.

FIG. 17 depicts another implementation 1700 in which the device 104 corresponds to, or is integrated within, a vehicle 1702, illustrated as a car. The vehicle 1702 includes the one or more processors 160 including the meeting manager 162, interruption manager 164, the GUI generator 168, or a combination thereof. The vehicle 1702 also includes the speaker 154, a microphone 1710, or both. User speech detection can be performed based on the speech audio stream 111 output by the meeting manager 162 or the synthesized speech audio stream 133 output by the interruption manager 164. For example, the user speech detection can be used to detect a voice command from an authorized user of the vehicle 1702 (e.g., to start the engine or heating). In a particular implementation, in response to receiving a verbal command identified as user speech in the speech audio stream 111 output by the meeting manager 162 or in the synthesized speech audio stream 133 output by the interruption manager 164, a voice activation system of the vehicle 1702 initiates one or more operations of the vehicle 1702 based on one or more keywords (e.g., "unlock," "start engine," "play music," "display weather forecast," or another voice command) detected in the speech audio stream 111 or the synthesized speech audio stream 133, such as by providing feedback or information via a display 1720 or one or more speakers (e.g., the speaker 154). In a particular implementation, the GUI generator 168 provides information regarding an online meeting (e.g., a call) to the display 1720. For example, the GUI generator 168 provides the GUI 145 to the display 1720.

Figure 18:
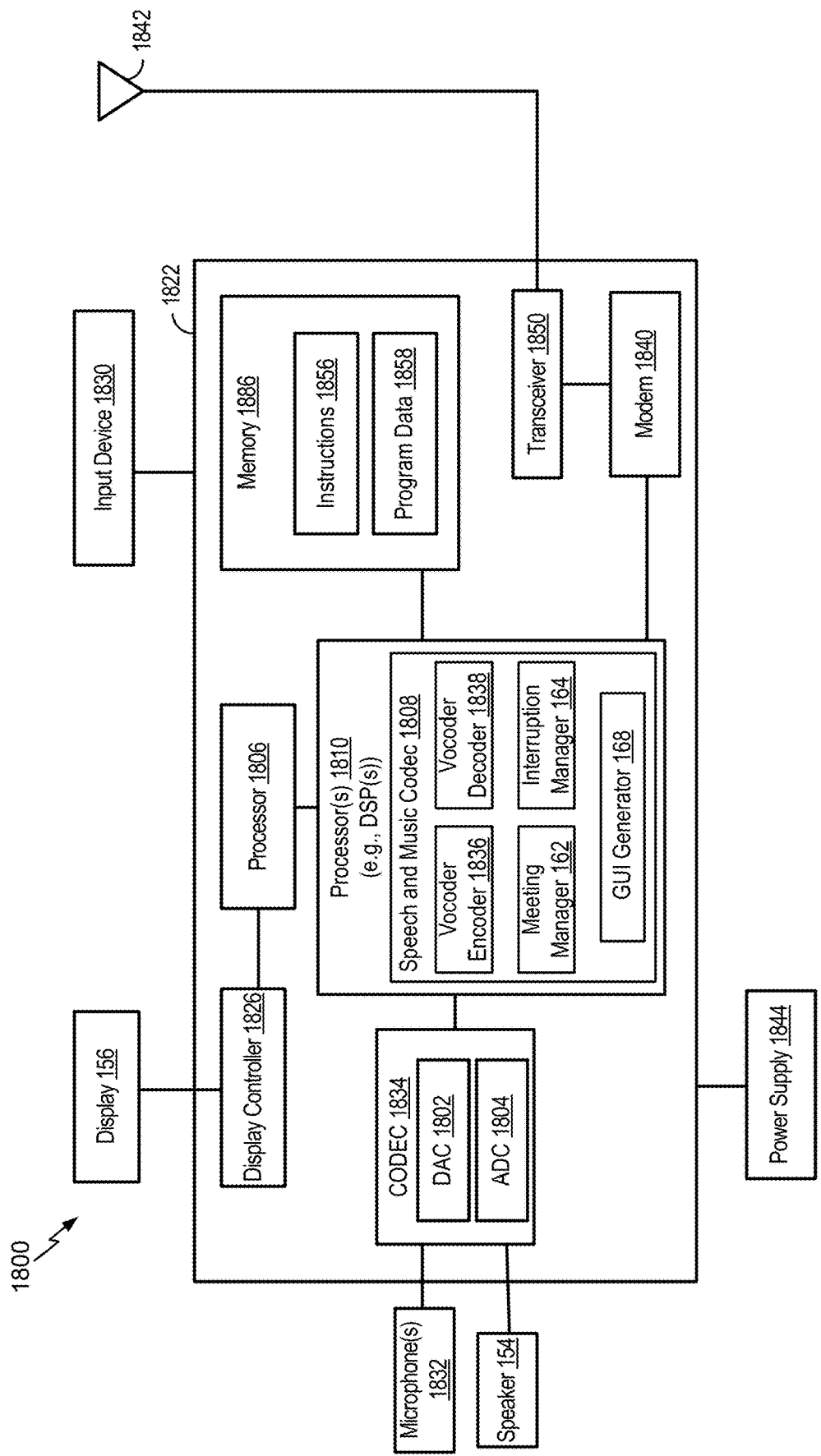
FIG. 18 is a block diagram of a particular illustrative example of a device that is operable to handle speech audio stream interruptions, in accordance with some examples of the present disclosure.

Referring to FIG. 18, a block diagram of a particular illustrative implementation of a device is depicted and generally designated 1800. In various implementations, the device 1800 may have more or fewer components than illustrated in FIG. 18. In an illustrative implementation, the device 1800 may correspond to the device 104. In an illustrative implementation, the device 1800 may perform one or more operations described with reference to FIGS. 1-17.

In a particular implementation, the device 1800 includes a processor 1806 (e.g., a central processing unit (CPU)). The device 1800 may include one or more additional processors 1810 (e.g., one or more DSPs). In a particular aspect, the one or more processors 160 of FIG. 1 corresponds to the processor 1806, the processors 1810, or a combination thereof. The processors 1810 may include a speech and music coder-decoder (CODEC) 1808 that includes a voice coder ("vocoder") encoder 1836, a vocoder decoder 1838, the meeting manager 162, the interruption manager 164, the GUI generator 168, or a combination thereof. In a particular aspect, the one or more processors 160 of FIG. 1 include the processor 1806, the processors 1810, or a combination thereof.

The device 1800 may include a memory 1886 and a CODEC 1834. The memory 1886 may include instructions 1856, that are executable by the one or more additional processors 1810 (or the processor 1806) to implement the functionality described with reference to the meeting manager 162, the interruption manager 164, the GUI generator 168, or a combination thereof. In a particular aspect, the memory 1886 stores program data 1858 used or generated by the meeting manager 162, the interruption manager 164, the GUI generator 168, or a combination thereof. In a particular aspect, the memory 1886 includes the memory 132 of FIG. 1. The device 1800 may include a modem 1840 coupled, via a transceiver 1850, to an antenna 1842.

The device 1800 may include the display device 156 coupled to a display controller 1826. The speaker 154 and one or more microphones 1832 may be coupled to the CODEC 1834. The CODEC 1834 may include a digital-to-analog converter (DAC) 1802, an analog-to-digital converter (ADC) 1804, or both. In a particular implementation, the CODEC 1834 may receive analog signals from the one or more microphones 1832, convert the analog signals to digital signals using the analog-to-digital converter 1804, and provide the digital signals to the speech and music codec 1808. The speech and music codec 1808 may process the digital signals, and the digital signals may further be processed by the meeting manager 162, the interruption manager 164, or both. In a particular implementation, the speech and music codec 1808 may provide digital signals to the CODEC 1834. The CODEC 1834 may convert the digital signals to analog signals using the digital-to-analog converter 1802 and may provide the analog signals to the speaker 154.

In a particular implementation, the device 1800 may be included in a system-in-package or system-on-chip device 1822. In a particular implementation, the memory 1886, the processor 1806, the processors 1810, the display controller 1826, the CODEC 1834, the modem 1840, and the transceiver 1850 are included in a system-in-package or system-on-chip device 1822. In a particular implementation, an input device 1830 and a power supply 1844 are coupled to the system-on-chip device 1822. Moreover, in a particular implementation, as illustrated in FIG. 18, the display device 156, the input device 1830, the speaker 154, the one or more microphones 1832, the antenna 1842, and the power supply 1844 are external to the system-on-chip device 1822. In a particular implementation, each of the display device 156, the input device 1830, the speaker 154, the one or more microphones 1832, the antenna 1842, and the power supply 1844 may be coupled to a component of the system-on-chip device 1822, such as an interface or a controller.

The device 1800 may include a virtual assistant, a home appliance, a smart device, an internet of things (IoT) device, a communication device, a headset, a vehicle, a computer, a display device, a television, a gaming console, a music player, a radio, a video player, an entertainment unit, a personal media player, a digital video player, a camera, a navigation device, a smart speaker, a speaker bar, a mobile communication device, a smart phone, a cellular phone, a laptop computer, a tablet, a personal digital assistant, a digital video disc (DVD) player, a tuner, an augmented reality headset, a virtual reality headset, an aerial vehicle, a home automation system, a voice-activated device, a wireless speaker and voice activated device, a portable electronic device, a car, a computing device, a virtual reality (VR) device, a base station, a mobile device, or any combination thereof.

In conjunction with the described implementations, an apparatus includes means for receiving a speech audio stream during an online meeting, the speech audio stream representing speech of a first user. For example, the means for receiving the speech audio stream can correspond to the meeting manager 162, the interruption manager 164, the one or more processors 160, the device 104, the system 100 of FIG. 1, the meeting manager 122, the server 204, the system 200 of FIG. 2, the one or more processors 1810, the processor 1806, the speech and music codec 1808, the modem 1840, the transceiver 1850, the antenna 1842, the device 1800, one or more other circuits or components configured to receive a speech audio stream during an online meeting, or any combination thereof.

The apparatus also includes means for receiving a text stream representing the speech of the first user. For example, the means for receiving the text stream can correspond to the meeting manager 162, the interruption manager 164, the text-to-speech converter 166, the one or more processors 160, the device 104, the system 100 of FIG. 1, the meeting manager 122, the interruption manager 124, the server 204, the system 200 of FIG. 2, the one or more processors 1810, the processor 1806, the speech and music codec 1808, the modem 1840, the transceiver 1850, the antenna 1842, the device 1800, one or more other circuits or components configured to receive a text stream, or any combination thereof.

The apparatus further includes means for selectively generating an output based on the text stream in response to an interruption in the speech audio stream. For example, the means for selectively generating the output can correspond to the interruption manager 164, the text-to-speech converter 166, the GUI generator 168, the one or more processors 160, the device 104, the system 100 of FIG. 1, the interruption manager 124, the server 204, the system 200 of FIG. 2, the one or more processors 1810, the processor 1806, the speech and music codec 1808, the device 1800, one or more other circuits or components configured to selectively generate the output, or any combination thereof.

In some implementations, a non-transitory computer-readable medium (e.g., a computer-readable storage device, such as the memory 1886) includes instructions (e.g., the instructions 1856) that, when executed by one or more processors (e.g., the one or more processors 1810 or the processor 1806), cause the one or more processors to receive, during an online meeting, a speech audio stream (e.g., the speech audio stream 111) representing speech of a first user (e.g., the user 142). The instructions, when executed by the one or more processors, also cause the one or more processors to receive a text stream (e.g., the text stream 121) representing the speech of the first user (e.g., the user 142). The instructions, when executed by the one or more processors, further cause the one or more processors to selectively generate an output (e.g., the synthesized speech audio stream 133, the annotated text stream 137, or both) based on the text stream in response to an interruption in the speech audio stream.

Particular aspects of the disclosure are described below in a first set of interrelated clauses:

According to Clause 1, a device for communication includes: one or more processors configured to: receive, during an online meeting, a speech audio stream representing speech of a first user; receive a text stream representing the speech of the first user; and selectively generate an output based on the text stream in response to an interruption in the speech audio stream.

Clause 2 includes the device of Clause 1, wherein the one or more processors are configured to detect the interruption in response to determining that no audio frames of the speech audio stream are received within a threshold duration of a last received audio frame of the speech audio stream.

Clause 3 includes the device of Clause 1, wherein the one or more processors are configured to detect the interruption in response to receiving the text stream.

Clause 4 includes the device of Clause 1, wherein the one or more processors are configured to detect the interruption in response to receiving an interruption notification.

Clause 5 includes the device of any of Clauses 1 to 4, wherein the one or more processors are configured to provide the text stream as the output to a display.

Clause 6 includes the device of any of Clauses 1 to 5, wherein the one or more processors are further configured to: receive a metadata stream indicating intonations of the speech of the first user; and annotate the text stream based on the metadata stream.

Clause 7 includes the device of any of Clauses 1 to 6, wherein the one or more processors are further configured to: perform text-to-speech conversion on the text stream to generate a synthesized speech audio stream; and provide the synthesized speech audio stream as the output to a speaker.

Clause 8 includes the device of Clause 7, wherein the one or more processors are further configured to receive a metadata stream indicating intonations of the speech of the first user, wherein the text-to-speech conversion is based on the metadata stream.

Clause 9 includes the device of Clause 7, wherein the one or more processors are further configured to display an avatar concurrently with providing the synthesized speech audio stream to the speaker.

Clause 10 includes the device of Clause 9, wherein the one or more processors are configured to receive a media stream during the online meeting, the media stream including the speech audio stream and a video stream of the first user.

Clause 11 includes the device of Clause 10, wherein the one or more processors are configured to, in response to the interruption: halt playback of the speech audio stream; and halt playback of the video stream.

Clause 12 includes the device of Clause 10, wherein the one or more processors are configured to, in response to the interruption ending: refrain from providing the synthesized speech audio stream to the speaker; refrain from displaying the avatar; resume playback of the video stream; and resume playback of the speech audio stream.

Clause 13 includes the device of Clause 7, wherein the text-to-speech conversion is performed based on a speech model.

Clause 14 includes the device of Clause 13, wherein the speech model corresponds to a generic speech model.

Clause 15 includes the device of Clause 13 or Clause 14, wherein the one or more processors are configured to, prior to the interruption, update the speech model based on the speech audio stream.

Clause 16 includes the device of any of Clauses 1 to 15, wherein the one or more processors are configured to: receive, during the online meeting, a second speech audio stream representing speech of a second user; and provide the second speech audio stream to a speaker concurrently with generating the output.

Clause 17 includes the device of any of Clauses 1 to 16, wherein the one or more processors are configured to: halt playback of the speech audio stream in response to the interruption in the speech audio stream; and in response to the interruption ending: refrain from generating the output based on the text stream; and resume playback of the speech audio stream.

Particular aspects of the disclosure are described below in a second set of interrelated clauses:

According to Clause 18, a method of communication includes: receiving, at a device during an online meeting, a speech audio stream representing speech of a first user; receiving, at the device, a text stream representing the speech of the first user; and selectively generating, at the device, an output based on the text stream in response to an interruption in the speech audio stream.

Clause 19 includes the method of Clause 18, further including detecting the interruption in response to determining that no audio frames of the speech audio stream are received within a threshold duration of a last received audio frame of the speech audio stream.

Clause 20 includes the method of Clause 18, further including detecting the interruption in response to receiving the text stream.

Clause 21 includes the method of Clause 18, further including detecting the interruption in response to receiving an interruption notification.

Clause 22 includes the method of any of Clauses 18 to 21, further including providing the text stream as the output to a display.

Clause 23 includes the method of any of Clauses 18 to 22, further including: receiving a metadata stream indicating intonations of the speech of the first user; and annotating the text stream based on the metadata stream.

Particular aspects of the disclosure are described below in a third set of interrelated clauses:

According to Clause 24, a non-transitory computer-readable storage medium stores instructions that, when executed by one or more processors, cause the one or more processors to: receive, during an online meeting, a speech audio stream representing speech of a first user; receive a text stream representing the speech of the first user; and selectively generate an output based on the text stream in response to an interruption in the speech audio stream.

Clause 25 includes the non-transitory computer-readable storage medium of Clause 24, wherein the instructions, when executed by the one or more processors, cause the one or more processors to: perform text-to-speech conversion on the text stream to generate a synthesized speech audio stream; and provide the synthesized speech audio stream as the output to a speaker.

Clause 26 includes the non-transitory computer-readable storage medium of Clause 25, wherein the instructions, when executed by the one or more processors, cause the one or more processors to receive a metadata stream indicating intonations of the speech of the first user, wherein the text-to-speech conversion is based on the metadata stream.

Clause 27 includes the non-transitory computer-readable storage medium of Clause 25 or Clause 26, wherein the instructions, when executed by the one or more processors, cause the one or more processors to display an avatar concurrently with providing the synthesized speech audio stream to the speaker.

Clause 28 includes the non-transitory computer-readable storage medium of any of Clauses 25 to 27, wherein the instructions, when executed by the one or more processors, cause the one or more processors to, prior to the interruption, update a speech model based on the speech audio stream, and wherein the text-to-speech conversion is performed based on a speech model.

Particular aspects of the disclosure are described below in a fourth set of interrelated clauses:

According to Clause 29, an apparatus includes: means for receiving a speech audio stream during an online meeting, the speech audio stream representing speech of a first user; means for receiving a text stream representing the speech of the first user; and means for selectively generating an output based on the text stream in response to an interruption in the speech audio stream.

Clause 30 includes the apparatus of Clause 29, wherein the means for receiving the speech audio stream, the means for receiving the text stream, and the means for selectively generating the output are integrated into at least one of a virtual assistant, a home appliance, a smart device, an internet of things (IoT) device, a communication device, a headset, a vehicle, a computer, a display device, a television, a gaming console, a music player, a radio, a video player, an entertainment unit, a personal media player, a digital video player, a camera, or a navigation device.

Those of skill would further appreciate that the various illustrative logical blocks, configurations, modules, circuits, and algorithm steps described in connection with the implementations disclosed herein may be implemented as electronic hardware, computer software executed by a processor, or combinations of both. Various illustrative components, blocks, configurations, modules, circuits, and steps have been described above generally in terms of their functionality. Whether such functionality is implemented as hardware or processor executable instructions depends upon the particular application and design constraints imposed on the overall system. Skilled artisans may implement the described functionality in varying ways for each particular application, such implementation decisions are not to be interpreted as causing a departure from the scope of the present disclosure.

The steps of a method or algorithm described in connection with the implementations disclosed herein may be embodied directly in hardware, in a software module executed by a processor, or in a combination of the two. A software module may reside in random access memory (RAM), flash memory, read-only memory (ROM), programmable read-only memory (PROM), erasable programmable read-only memory (EPROM), electrically erasable programmable read-only memory (EEPROM), registers, hard disk, a removable disk, a compact disc read-only memory (CD-ROM), or any other form of non-transient storage medium known in the art. An exemplary storage medium is coupled to the processor such that the processor may read information from, and write information to, the storage medium. In the alternative, the storage medium may be integral to the processor. The processor and the storage medium may reside in an application-specific integrated circuit (ASIC). The ASIC may reside in a computing device or a user terminal. In the alternative, the processor and the storage medium may reside as discrete components in a computing device or user terminal.

The previous description of the disclosed aspects is provided to enable a person skilled in the art to make or use the disclosed aspects. Various modifications to these aspects will be readily apparent to those skilled in the art, and the principles defined herein may be applied to other aspects without departing from the scope of the disclosure. Thus, the present disclosure is not intended to be limited to the aspects shown herein but is to be accorded the widest scope possible consistent with the principles and novel features as defined by the following claims.

What is claimed is:

1. A device for communication comprising:
   one or more processors configured to:
      receive, from a second device during an online meeting, a speech audio stream representing speech of a first user based on an audio input;
      receive, from the second device, a text stream representing the speech of the first user based on the audio input;
      receive, from the second device, a metadata stream that is based on the audio input; and
      selectively generate an output based on the text stream and the metadata stream in response to an interruption in the speech audio stream.

2. The device of claim 1, wherein the one or more processors are configured to detect the interruption in response to determining that no audio frames of the speech audio stream are received within a threshold duration of a last received audio frame of the speech audio stream.

3. The device of claim 1, wherein the one or more processors are configured to detect the interruption in response to receiving the text stream.

4. The device of claim 1, wherein the one or more processors are configured to detect the interruption in response to receiving an interruption notification.

5. The device of claim 1, wherein the metadata stream indicates intonations of the speech of the first user.

6. The device of claim 1, wherein the one or more processors are further configured to:
   annotate the text stream based on the metadata stream to generate an annotated text stream; and
   provide the annotated text stream as the output to a display.

7. The device of claim 1, wherein the one or more processors are further configured to:
   perform text-to-speech conversion on the text stream and based on the metadata stream to generate a synthesized speech audio stream; and
   provide the synthesized speech audio stream as the output to a speaker.

8. The device of claim 7, wherein the one or more processors are further configured to display an avatar concurrently with providing the synthesized speech audio stream to the speaker.

9. The device of claim 8, wherein the avatar comprises a first representation based on use of an untrained speech model to perform the text-to-speech conversion, and wherein the avatar comprises a second representation different than the first representation based on use of a trained speech model to perform the text-to-speech conversion.

10. The device of claim 9, wherein the one or more processors are configured to receive a media stream during the online meeting, the media stream including the speech audio stream and a video stream of the first user.

11. The device of claim 10, wherein the one or more processors are configured to, in response to the interruption:
   halt playback of the speech audio stream; and
   halt playback of the video stream.

12. The device of claim 10, wherein the one or more processors are configured to, in response to the interruption ending:
   refrain from providing the synthesized speech audio stream to the speaker;
   refrain from displaying the avatar;
   resume playback of the video stream; and
   resume playback of the speech audio stream.

13. The device of claim 7, wherein the text-to-speech conversion is performed based on a speech model.

14. The device of claim 13, wherein the speech model corresponds to a generic speech model.

15. The device of claim 13, wherein the one or more processors are configured to, prior to the interruption, update the speech model based on the speech audio stream.

16. The device of claim 1, wherein the one or more processors are configured to:
   receive, during the online meeting, a second speech audio stream representing speech of a second user; and
   provide the second speech audio stream to a speaker concurrently with generating the output.

17. The device of claim 1, wherein the one or more processors are configured to:
   halt playback of the speech audio stream in response to the interruption in the speech audio stream; and
   in response to the interruption ending:
      refrain from generating the output based on the text stream; and
      resume playback of the speech audio stream.

18. A method of communication comprising:
   receiving, at a device from a second device during an online meeting, a speech audio stream representing speech of a first user based on an audio input;
   receiving, at the device from the second device, a text stream representing the speech of the first user based on the audio input;
   receiving, at the device from the second device, a metadata stream that is based on the audio input; and
   selectively generating, at the device, an output based on the text stream and the metadata stream in response to an interruption in the speech audio stream.

19. The method of claim 18, further comprising detecting the interruption in response to determining that no audio frames of the speech audio stream are received within a threshold duration of a last received audio frame of the speech audio stream.

20. The method of claim 18, further comprising detecting the interruption in response to receiving the text stream.

21. The method of claim 18, further comprising detecting the interruption in response to receiving an interruption notification.

22. The method of claim 18, further comprising annotating the text stream based on the metadata stream to generate an annotated text stream.

23. The method of claim 22, further comprising providing the annotated text stream as the output to a display.

24. A non-transitory computer-readable storage medium storing instructions that, when executed by one or more processors, cause the one or more processors to:

receive, from a second device during an online meeting, a speech audio stream representing speech of a first user based on an audio input;

receive, from the second device, a text stream representing the speech of the first user based on the audio input;

receive, from the second device, a metadata stream that is based on the audio input; and selectively generate an output based on the text stream and the metadata stream in response to an interruption in the speech audio stream.

25. The non-transitory computer-readable storage medium of claim 24, wherein the instructions, when executed by the one or more processors, cause the one or more processors to:

perform text-to-speech conversion on the text stream and based on the metadata stream to generate a synthesized speech audio stream; and provide the synthesized speech audio stream as the output to a speaker.

26. The non-transitory computer-readable storage medium of claim 25, wherein the instructions, when executed by the one or more processors, cause the one or more processors to display an avatar concurrently with providing the synthesized speech audio stream to the speaker.

27. The non-transitory computer-readable storage medium of claim 26, wherein the avatar comprises a first representation based on use of an untrained speech model to perform the text-to-speech conversion, and wherein the avatar comprises a second representation different than the first representation based on use of a trained speech model to perform the text-to-speech conversion.

28. The non-transitory computer-readable storage medium of claim 25, wherein the instructions, when executed by the one or more processors, cause the one or more processors to, prior to the interruption, update a speech model based on the speech audio stream, and wherein the text-to-speech conversion is performed based on the speech model.

29. An apparatus comprising:

means for receiving a speech audio stream from a second device during an online meeting, the speech audio stream representing speech of a first user based on an audio input;

means for receiving, from the second device, a text stream representing the speech of the first user based on the audio input;

means for receiving, from the second device, a metadata stream that is based on the audio input; and means for selectively generating an output based on the text stream and the metadata stream in response to an interruption in the speech audio stream.

30. The apparatus of claim 29, wherein the means for receiving the speech audio stream, the means for receiving the text stream, the means for receiving the metadata stream, and the means for selectively generating the output are integrated into at least one of a virtual assistant, a home appliance, a smart device, an internet of things (IoT) device, a communication device, a headset, a vehicle, a computer, a display device, a television, a gaming console, a music player, a radio, a video player, an entertainment unit, a personal media player, a digital video player, a camera, or a navigation device.

* * * * *